US012317205B2

(12) United States Patent
Lakshmipathi

(10) Patent No.: US 12,317,205 B2
(45) Date of Patent: May 27, 2025

(54) METHOD AND SYSTEMS FOR PERFORMING 3GPP NB-IOT NSSS FRAME NUMBER AND CFO DETECTION IN LOW SNR CONDITIONS

(71) Applicant: Alif Semiconductor Singapore Private Ltd., Singapore (SG)

(72) Inventor: Sondur Lakshmipathi, Bangalore (IN)

(73) Assignee: Alif Semiconductor Singapore Private Ltd., Singapore (SG)

( * ) Notice: Subject to any disclaimer, the term of this patent is extended or adjusted under 35 U.S.C. 154(b) by 413 days.

(21) Appl. No.: 17/820,389

(22) Filed: Aug. 17, 2022

(65) Prior Publication Data

US 2024/0073833 A1 Feb. 29, 2024

(51) Int. Cl.
| | |
|---|---|
| H04W 56/00 | (2009.01) |
| H04J 11/00 | (2006.01) |
| H04L 27/26 | (2006.01) |
| H04W 4/70 | (2018.01) |
| H04W 48/16 | (2009.01) |
| H04W 84/04 | (2009.01) |

(52) U.S. Cl.
CPC ....... *H04W 56/001* (2013.01); *H04L 27/2636* (2013.01); *H04W 4/70* (2018.02); *H04W 48/16* (2013.01); *H04W 56/0095* (2013.01); *H04W 84/045* (2013.01)

(58) Field of Classification Search
CPC ..... H04W 56/001; H04W 4/70; H04W 48/16; H04W 56/0095; H04W 84/045; H04L 27/2636
USPC ........................................................ 370/350
See application file for complete search history.

(56) References Cited

U.S. PATENT DOCUMENTS

2018/0270771 A1* 9/2018 Chendamarai Kannan ................. H04L 27/2675

OTHER PUBLICATIONS

ETSI Technical Specification: "LTE; Evolved Universal Terrestrial Radio Access (E-UTRA); Physical channels and modulation (3GPP TS 36.211 version 16.6.0 Release 16)", ETSI TS 136211 v16.6.0, Aug. 2021 [online]. 254 pages. URL: https://www.etsi.org/deliver/etsi_ts/136200_136299/136211/16.06.00_60/ts_136211v160600p.pdf [retrieved Aug. 17, 2022].

* cited by examiner

*Primary Examiner* — Xuan Lu
(74) *Attorney, Agent, or Firm* — Weaver Austin Villeneuve & Sampson LLP

(57) ABSTRACT

A computer-implemented method for determining the system frame number (SFN) of a radio frame includes receiving a synchronization signal sequence transmitted by a cell in a synchronization signal subframe, determining a physical cell identity (PCID) of the cell based on the synchronization signal sequence, equalizing the synchronization signal sequence using an ideal PCID vector of the determined PCID, partitioning the equalized synchronization signal sequence into multiple segments that include at least one segment overlapping with two other segments of the multiple segments, windowing each segment of the multiple segments, computing power spectra of the multiple windowed segments, determining an averaged power spectrum of the equalized synchronization signal sequence based on the power spectra of the multiple windowed segments, and estimating the SFN associated with the synchronization signal subframe based on a location of a peak signal of the averaged power spectrum of the equalized synchronization signal sequence.

20 Claims, 17 Drawing Sheets

FIG. 4

METHOD AND SYSTEMS FOR PERFORMING 3GPP NB-IOT NSSS FRAME NUMBER AND CFO DETECTION IN LOW SNR CONDITIONS

BACKGROUND

Third Generation Partnership Project (3GPP) standards provide various forms of radio access technologies (RATs) such as Long Term Evolution (LTE) and 5G New Radio (NR), and associated wireless communication configurations and protocols such as Narrow Band-Internet of Things (NB-IoT) and enhanced Machine Type Communication (eMTC). For example, NB-IoT may be used for ultra-low-end Internet of Things (IoT) applications that demand low cost, high reliability, and ultra-low power, such as home automation, smart health, smart factory, and smart environment.

An NB-IoT User Equipment (UE) generally needs to perform a series of processes of cell acquisition and synchronization in order to connect to a serving cell (more specifically, a base station or access point, such as an enhanced base station or evolved NodeB (eNodeB or eNB)). For example, a UE may need to detect and select a suitable cell to connect to, perform coarse and fine estimation of the timing, frequency, and phase of the cell, and acquire the specific Physical Cell Identifier (PCID) of the cell. During these processes, the UE may not have information of the system timing, and the local frequency of the UE may not be synchronized to the cell or the network yet. Furthermore, many NB-IoT UEs use low-cost crystal oscillators that may have a high Carrier Frequency Offset (CFO), such as up to about 20 parts per million (ppm) or larger. Thus, there may be a relatively large offset in both the time and frequency between a UE and the network, and such time and frequency offsets can significantly deteriorate the performance of the initial synchronization and synchronizations during operations of the UE. In some 3GPP standards, the frequency and time offsets may be estimated using downlink synchronization signals. For example, in NB-IoT, the frequency and time offsets between an eNB and a UE may be estimated and compensated using the Narrowband Primary Synchronization Signal (NPSS), while the PCID and System Frame Number (SFN) may be detected using Narrowband Secondary Synchronization Signal (NSSS).

SUMMARY

This disclosure relates generally to 3rd Generation Partnership Project (3GPP) based wireless communications. More specifically, disclosed herein are techniques for robust System Frame Number (SFN) and Carrier Frequency Offset (CFO) estimation from received synchronization signals, such as Narrowband Secondary Synchronization signal (NSSS)) that may have very low signal-to-noise ratios (SNRs). Techniques disclosed herein may be used in 3GPP Long Term Evolution (LTE) and its associated variants, including Narrowband Internet of Thing (NB-IoT), Enhanced Machine Type of Communication (eMTC), 5G New Radio, and the like. Various inventive embodiments are described herein, including devices, systems, methods, processes, computer-readable storage media, and the like.

According to certain embodiments, a method may include receiving a synchronization signal sequence transmitted by a cell in a synchronization signal subframe; determining a physical cell identity (PCID) of the cell based on the synchronization signal sequence; equalizing the synchronization signal sequence using an ideal PCID vector of the determined PCID; partitioning the equalized synchronization signal sequence into multiple segments that include at least one segment overlapping with two other segments of the multiple segments; windowing each segment of the multiple segments; computing power spectra of the multiple windowed segments; determining an averaged power spectrum of the equalized synchronization signal sequence based on the power spectra of the multiple windowed segments; and estimating a system frame number (SFN) associated with the synchronization signal subframe based on a location of a peak signal of the averaged power spectrum of the equalized synchronization signal sequence.

In some embodiments of the method, the cell may include a Narrowband Internet of Thing (NB-IoT) cell. The synchronization signal sequence may include a Narrowband Secondary Synchronization Signal (NSSS) sequence. In some embodiments, estimating the SFN associated with the synchronization signal subframe may include dividing the averaged power spectrum of the equalized synchronization signal sequence into four frequency zones each corresponding to a respective SFN, and estimating the SFN associated with the synchronization signal subframe based on a frequency zone in which the peak signal of the averaged power spectrum is located.

In some embodiments, determining the PCID of the cell based on the synchronization signal sequence may include correlating the synchronization signal sequence with a PCID matrix that includes ideal PCID vectors of a plurality of PCIDs. Equalizing the synchronization signal sequence using the ideal PCID vector of the determined PCID may include dividing the synchronization signal sequence by the ideal PCID vector of the determined PCID. An overlap between two consecutive segments of the multiple segments may be greater than zero and may be equal to or less than a half of a size of the at least one segment. In some embodiments, partitioning the equalized synchronization signal sequence into the multiple segments may include partitioning the equalized synchronization signal sequence into three segments, a size of each segment of the three segments may be equal to a half of a size of the equalized synchronization signal sequence, and the overlap between two consecutive segments of the three segments may be equal to a half of the size of each segment of the three segments.

In some embodiments, windowing each segment of the multiple segments may include applying an apodization function to the segment to gradually bring elements of the segment to zero at both ends of the segment. The apodization function may include a Hanning window, a Hamming window, a cosine window, a Blackman window, a Gaussian window, a Bartlett window, a Welch window, a Nuttall window, or a Blackman-Harris window. In some embodiments, computing the power spectra of the multiple windowed segments may include, for each windowed segment of the multiple windowed segments, performing a discrete Fourier transform (DFT) on the windowed segment, and determining a periodogram of the windowed segment based on the DFT.

In some embodiments, the method may also include selecting a segment of the equalized synchronization signal sequence based on the estimated SFN, computing a high-order DFT of the selected segment of the equalized synchronization signal sequence, determining a power spectrum of the selected segment of the equalized synchronization signal sequence based on the high-order DFT, determining a location of a peak signal in a power spectrum of an ideal SFN determination sequence for the estimated SFN, and determining a Carrier Frequency Offset (CFO) of a user equipment (UE) based on an offset between the location of the peak signal in the power spectrum of the ideal SFN determination sequence for the estimated SFN and a location of a peak signal in the power spectrum of the selected segment of the equalized synchronization signal sequence.

According to certain embodiments, a device may include a wireless receiver, a memory, and one or more processing units communicatively coupled to the wireless receiver and the memory. The one or more processing units may be configured to perform operations including: receiving, via the wireless receiver, a synchronization signal sequence transmitted by a cell in a synchronization signal subframe; determining a physical cell identity (PCID) of the cell based on the synchronization signal sequence; equalizing the synchronization signal sequence using an ideal PCID vector of the determined PCID; partitioning the equalized synchronization signal sequence into multiple segments, the multiple segments including at least one segment overlapping with two other segments of the multiple segments; windowing each segment of the multiple segments; computing periodograms of the multiple windowed segments; determining an averaged periodogram of the equalized synchronization signal sequence based on the periodograms of the multiple windowed segments; and estimating a system frame number (SFN) associated with the synchronization signal subframe based on a location of a peak signal in the averaged periodogram of the equalized synchronization signal sequence.

In some embodiments of the device, the cell may include a Narrowband Internet of Thing (NB-IoT) cell, the device may include an NB-IoT user equipment (UE), and the synchronization signal sequence may include a Narrowband Secondary Synchronization Signal (NSSS) sequence. Estimating the SFN associated with the synchronization signal subframe may include dividing the averaged periodogram of the equalized synchronization signal sequence into four frequency zones each corresponding to a respective SFN, and estimating the SFN associated with the synchronization signal subframe based on a frequency zone in which the peak signal of the averaged periodogram is located. In some embodiments, determining the PCID of the cell based on the synchronization signal sequence may include correlating the synchronization signal sequence with a PCID matrix that includes ideal PCID vectors of a plurality of PCIDs, and equalizing the synchronization signal sequence using the ideal PCID vector of the determined PCID comprises dividing the synchronization signal sequence by the ideal PCID vector of the determined PCID. In some embodiments, an overlap between two consecutive segments of the multiple segments may be greater than zero and may be equal to or less than a half of a size of the at least one segment. Windowing each segment of the multiple segments may include applying an apodization function to the segment to gradually bring elements of the segment to zero at both ends of the segment.

In some embodiments, the one or more processing units may be configured to perform operations that include selecting a segment of the equalized synchronization signal sequence based on the estimated SFN, computing a high-order DFT of the selected segment of the equalized synchronization signal sequence, determining a periodogram of the selected segment of the equalized synchronization signal sequence based on the high-order DFT, determining a location of a peak signal in a periodogram of an ideal SFN determination sequence for the estimated SFN, and determining a Carrier Frequency Offset (CFO) of the device based on an offset between the location of the peak signal in the periodogram of the ideal SFN determination sequence for the estimated SFN and a location of a peak signal in the periodogram of the selected segment of the equalized synchronization signal sequence.

According to certain embodiments, a non-transitory computer-readable medium may have instructions embedded thereon, the instructions, when executed by one or more processing units, may cause the one or more processing units to perform operations comprising: receiving a synchronization signal sequence transmitted by a cell in a synchronization signal subframe; determining a physical cell identity (PCID) of the cell based on the synchronization signal sequence; equalizing the synchronization signal sequence using an ideal PCID vector of the determined PCID; partitioning the equalized synchronization signal sequence into multiple segments that include at least one segment overlapping with two other segments of the multiple segments; windowing each segment of the multiple segments; computing power spectra of the multiple windowed segments; determining an averaged power spectrum of the equalized synchronization signal sequence based on the power spectra of the multiple windowed segments; and estimating a system frame number (SFN) associated with the synchronization signal subframe based on a location of a peak signal in the averaged power spectrum of the equalized synchronization signal sequence.

In some embodiments, the operations may also include selecting a segment of the equalized synchronization signal sequence based on the estimated SFN, computing a high-order DFT of the selected segment of the equalized synchronization signal sequence, determining a power spectrum of the selected segment of the equalized synchronization signal sequence based on the high-order DFT, determining a location of a peak signal in a power spectrum of an ideal SFN determination sequence for the estimated SFN, and determining a Carrier Frequency Offset (CFO) of a user equipment (UE) based on an offset between the location of the peak signal in the power spectrum of the ideal SFN determination sequence for the estimated SFN and a location of a peak signal in the power spectrum of the selected segment of the equalized synchronization signal sequence.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Various embodiments in accordance with the present disclosure will be described with reference to the drawings, in which:

FIG. 4 illustrates examples of length-128 Walsh-Hadamard sequences used for generating binary scrambling sequences of NSSS sequences.

DETAILED DESCRIPTION

Figure 1:
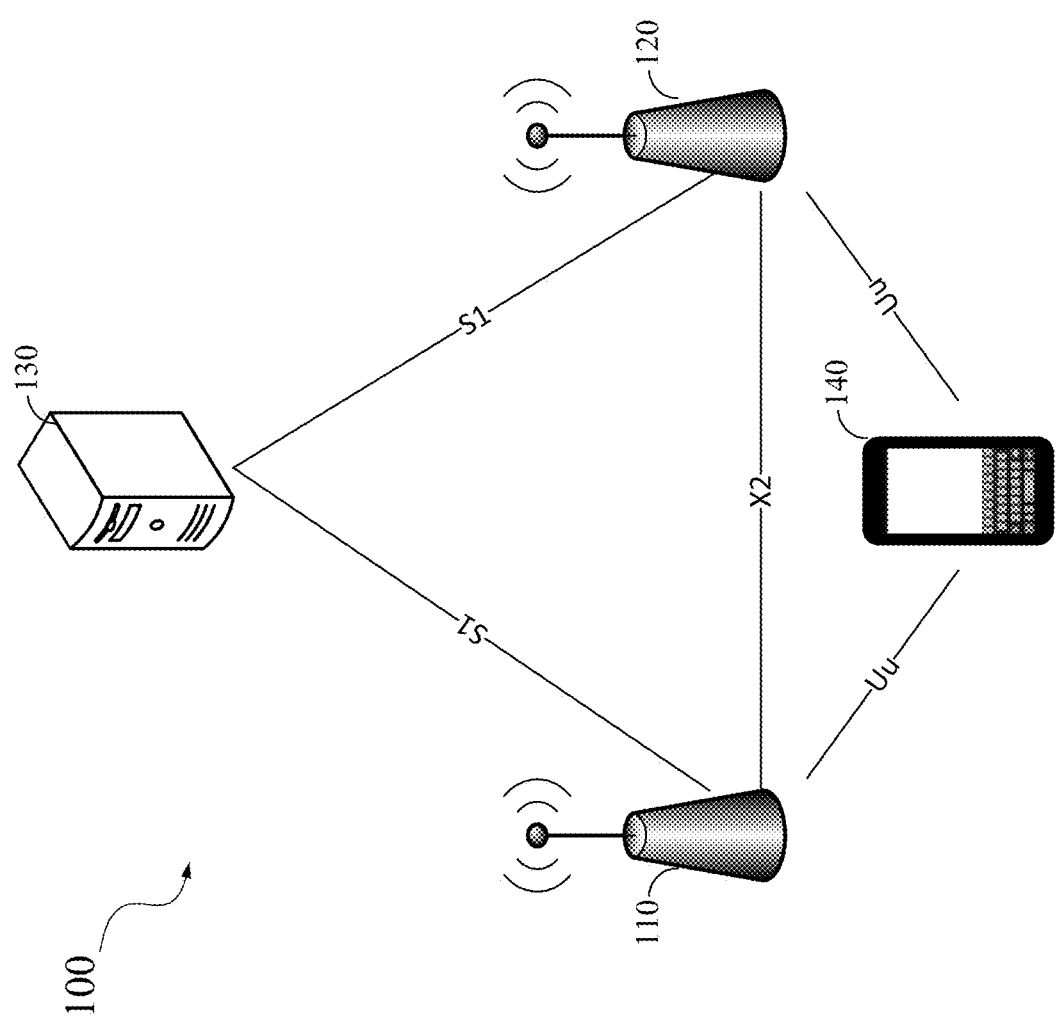
FIG. 1 illustrates an example of a Narrowband Internet of Thing (NB-IoT) network.

The present disclosure relates generally to 3rd Generation Partnership Project (3GPP) based wireless communications. More specifically, disclosed herein are techniques for robust System Frame Number (SFN) and Carrier Frequency Offset (CFO) estimation from received synchronization signals (e.g., Narrowband Secondary Synchronization Signal (NSSS)) that may have very low signal-to-noise ratios (SNRs). Techniques disclosed herein may be used in 3GPP Long Term Evolution (LTE) and its associated variants, including Narrowband Internet of Thing (NB-IoT), Enhanced Machine Type of Communication (eMTC), 5G New Radio, and the like. Various inventive embodiments are described herein, including devices, systems, methods, processes, computer-readable storage media, and the like.

In NB-IoT, to establish a connection with a base station or an access point of a cell, such as an enhanced or evolved base station (eNodeB or eNB), a user equipment (UE) may need to estimate and compensate the frequency and time offsets between the eNB and the UE using Narrowband Primary Synchronization Signals (NPSS) in downlink radio frames, and may need to detect the Physical Cell Identity (PCID, also referred to as Physical Cell Identifier or Physical Cell ID) and frame timing (e.g., System Frame Number or Radio Frame Number from the received NSSS signal sent by eNodeB). Both the NPSS and the NSSS are based on Zadoff-Chu (ZC) sequences in the frequency domain. An NPSS may be constructed from a length-11 ZC sequence, while an NSSS may have 132 elements and may be constructed by multiplying an extended ZC sequence, a binary complementary sequence (also referred to as a binary scrambling sequence), and a phase shift term in the frequency domain. Each NB-IoT radio frame in the downlink may include 10 subframes each having a duration of 1 ms. The NPSS sequences may be sent periodically in subframe 5 of each 10-ms radio frame, while NSSS sequences may be transmitted in subframe 9 of every even-numbered radio frame.

During synchronization processes, a UE may use NPSS sequences in downlink NPSS subframes to correct the CFO and detect Symbol Timing Offset (STO) with respect to the subframe boundary, for example, using auto-correlation and/or cross-correlation methods. The NPSS sequences may be fixed and may carry no specific information about the cell. The NSSS sequences may be used to detect the PCID and SFN within an ambiguity of 80 ms using, for example, Maximum Likelihood (ML) search-based methods that correlate a received NSSS sequence with possible ideal NSSS sequences that include PCID sequences and SFN determination sequences. PCID and SFN detection and CFO Estimation using NSSS may become complicated when noise is added by, for example, interference from neighboring cells. Under very low SNR conditions, such as SNR<=−7 dB (e.g., below up to about −20 dB, such as about −10 dB, −15 dB, or −17 dB), the ML search-based methods may give false or inconclusive estimations of the SFN. In addition, the CFO determined using the NPSS may not be sufficiently accurate.

According to certain embodiments, a method of estimating SFN information (e.g., least significant bits (LSBs) of the SFN) of a radio frame based on the NSSS may use averaged power spectra (or periodograms) of windowed, overlapped segments of an equalized (or normalized) NSSS sequence that includes SFN determination sequence information, to suppress noise and enhance the NSSS, thereby improving the detection of the peak signal in the power spectrum and hence the SFN, under very low SNR conditions, such as SNR between about −7 dB and about −20 dB. In addition, a high-order discrete Fourier transform (DFT) that may provide a higher resolution in the frequency domain may be performed on a segment of the equalized synchronization signal sequence selected based on the determined SFN, and the CFO of the UE may be estimated based on an offset between a peak signal in the result of the high-order DFT and an peak signal in the power spectrum of an ideal SFN determination sequence for the determined SFN.

In one example, a method of detecting the SFN information of a radio frame may include receiving a synchronization signal sequence (e.g., an NSSS sequence) transmitted by a cell in a synchronization signal subframe (e.g., an NSS subframe) of the radio frame, determining a PCID of the cell based on the synchronization signal sequence (e.g., by correlating the synchronization signal sequence with a PCID matrix that includes ideal PCID vectors of a plurality of PCIDs), equalizing the synchronization signal sequence using an ideal PCID vector of the determined PCID (e.g., by dividing the synchronization signal sequence by the ideal PCID vector of the determined PCID), partitioning the equalized synchronization signal sequence into multiple overlapped segments, windowing each segment of the multiple overlapped segments, computing power spectra (e.g., periodograms) of the windowed and overlapped segments, determining an averaged power spectrum of the equalized synchronization signal sequence based on the power spectra of the windowed and overlapped segments, and estimating the SFN associated with the radio frame based on a location of a peak signal of the averaged power spectrum of the equalized synchronization signal sequence. For example, in NB-IoT, to determine the SFN (more specifically, the 3 LSBs of the SFN) of a radio frame in an 80-ms NSSS repetition period, the averaged power spectrum of the equalized synchronization signal sequence may be divided into four frequency zones corresponding to four respective SFNs, and the SFN associated with the synchronization signal subframe may be estimated based on a frequency zone in which the peak signal of the averaged power spectrum is located.

In some embodiments, based on the determined SFN information, a CFO of the UE may be determined by selecting a segment of the equalized synchronization signal sequence based on the estimated SFN, computing a high-order DFT of the selected segment of the equalized synchronization signal sequence, determining a power spectrum of the selected segment of the equalized synchronization signal sequence based on the high-order DFT, determining a location of a peak signal in a power spectrum of an ideal SFN determination sequence for the estimated SFN, and determining the CFO of the UE based on an offset between the location of the peak signal in the power spectrum of the ideal SFN determination sequence for the estimated SFN and a location of a peak signal in the power spectrum of the selected segment of the equalized synchronization signal sequence.

As used herein, a "base station" or an "access point" may include a node B, an Evolved Node B (eNodeB or eNB), a base transceiver station (BTS), a radio base station (RBS), an NR NodeB (gNB), a Next Generation eNB (ng-eNB), or the like.

As used herein, a "cell" may generically refer to a logical communication entity used for communication with a base station (e.g., over some frequency resource referred to as a carrier frequency, component carrier (aggregated carrier with an increased bandwidth of, for example, 1.4, 3, 5, 10, 15, 20 MHz or higher), carrier, band, or the like), and may be associated with an identifier (e.g., a physical cell identifier (PCID), a virtual cell identifier (VCID), or a cell global identifier (CGID)) for distinguishing neighbor cells operating via the same or a different carrier frequency. In some examples, a carrier may support multiple cells, and different cells may be configured according to different protocol types (e.g., machine-type communication (MTC), NB-IoT, or enhanced mobile broadband (eMBB)) that may provide access for different types of devices. In some cases, the term "cell" may refer to a portion of a geographic coverage area (e.g., a sector) over which the logical entity operates.

As used herein, a User Equipment (UE) may include and/or may be referred to as a device, a mobile device, a wireless device, a mobile terminal, a terminal, a mobile station (MS), a secure user plane location (SUPL)-enabled terminal (SET), or by another name. Moreover, a UE may correspond to a cellphone, smartphone, laptop, tablet, personal data assistant (PDA), Internet of things (IoT) device, or some other portable or moveable device. A UE may support wireless communications using one or more RATs, such as using global system for mobile communications (GSM), code division multiple access (CDMA), wideband CDMA (WCDMA), long-term evolution (LTE), high rate packet data (HRPD), IEEE 802.11 Wi-Fi, Bluetooth, worldwide interoperability for microwave access (WiMAX), 5G NR, NB-IoT, and the like. A UE may also support wireless communication using a WLAN which may connect to other networks, such as the Internet.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 illustrates an example of an NB-IoT network 100. NB-IoT technology may enable improved indoor coverage, low cost, long battery life, and larger number of connected devices. In NB-IoT network 100, a UE 140 may be connected to eNBs, such as eNB 110 and eNB 120, using, for example, the LTE Uu interfaces. The eNBs may be connected together via X2 interfaces. The eNBs may also be connected to a Mobile Management Entity/serving gateway (MME/S-GW) 130 using S1 interfaces, which may carry either NB-IoT control packets or data packets. To establish a connection with an eNB (e.g., eNB 110 or eNB 120), UE 140 may need to estimate and compensate the frequency and time offsets between the eNB and the UE using the NPSS sequences transmitted in NPSS subframes of downlink radio frames, and detect the PCID and frame timing of the eNB using the NSSS sequences transmitted in NSSS subframes of even-numbered downlink radio frames.

Figure 2:
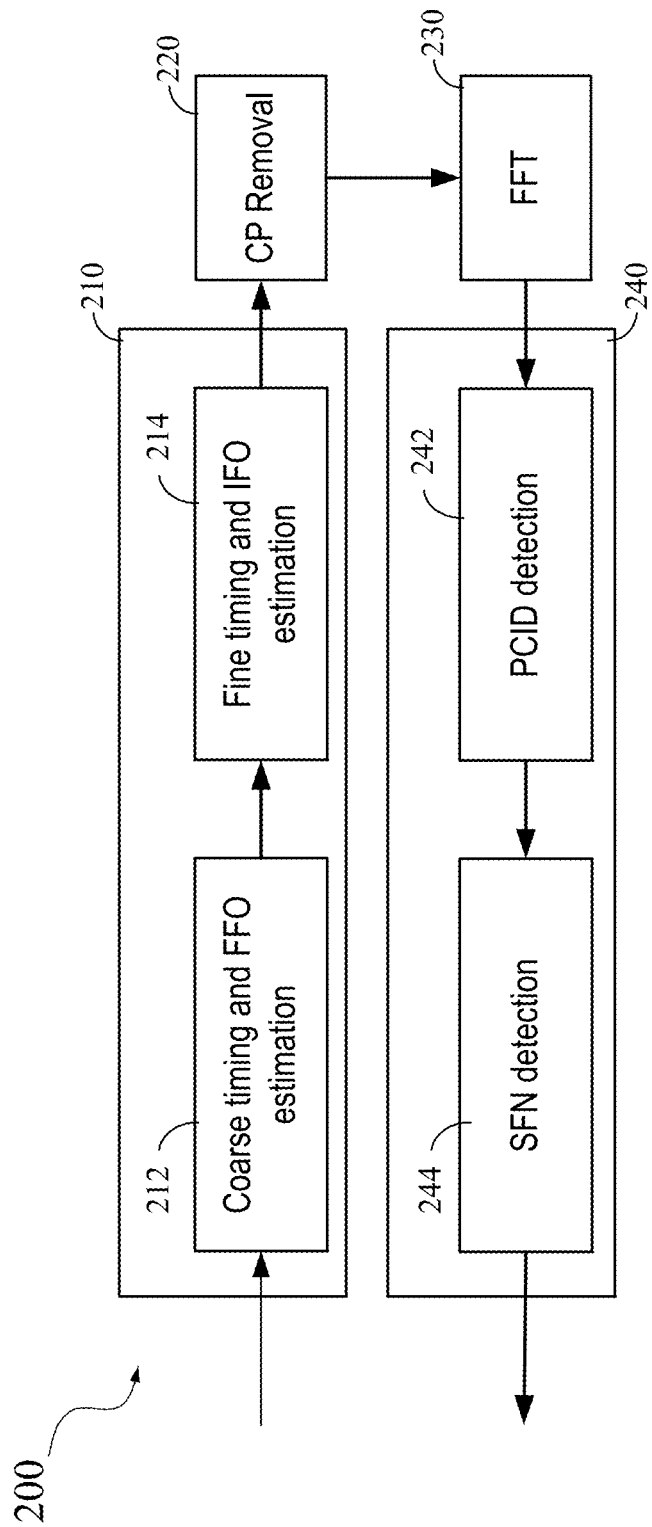
FIG. 2 illustrates an example of a synchronization and cell search procedure performed by an NB-IoT user equipment (UE).

FIG. 2 illustrates an example of a synchronization (e.g., initial synchronization or subsequent synchronization) and cell search procedure performed by a UE, such as UE 140. The procedure may include a process 210, during which an averaged auto-correlation metric may be used to explore the NPSS structure and detect coarse timing and fractional CFO (FFO) in an operation 212. Process 210 may also include, in an operation 214 after the coarse timing and frequency offset compensation, a joint detection of the Integer Frequency Offset (IFO) and fine timing using an NPSS matched filter, based on the cross-correlation between the detected NPSS and the local NPSS. Based on the time and frequency estimation and compensation, the Cyclic Prefix (CP) in guard periods between symbols in the time domain may be extracted and removed in the time-domain signal in an operation 220. In an operation 230, a DFT, such as Fast Fourier Transform (FFT), may be performed to transform the time-domain signal to a frequency-domain signal (e.g., a power spectrum or periodogram), and then post-FFT synchronization may be performed in a process 240 using the received NSSS. For example, in process 240, the PCID of the cell that transmits the NPSS and the NSSS may be estimated in an operation 242, and then the SFN of the received NSSS may be determined in an operation 244, as described in more details below.

Figure 3A:
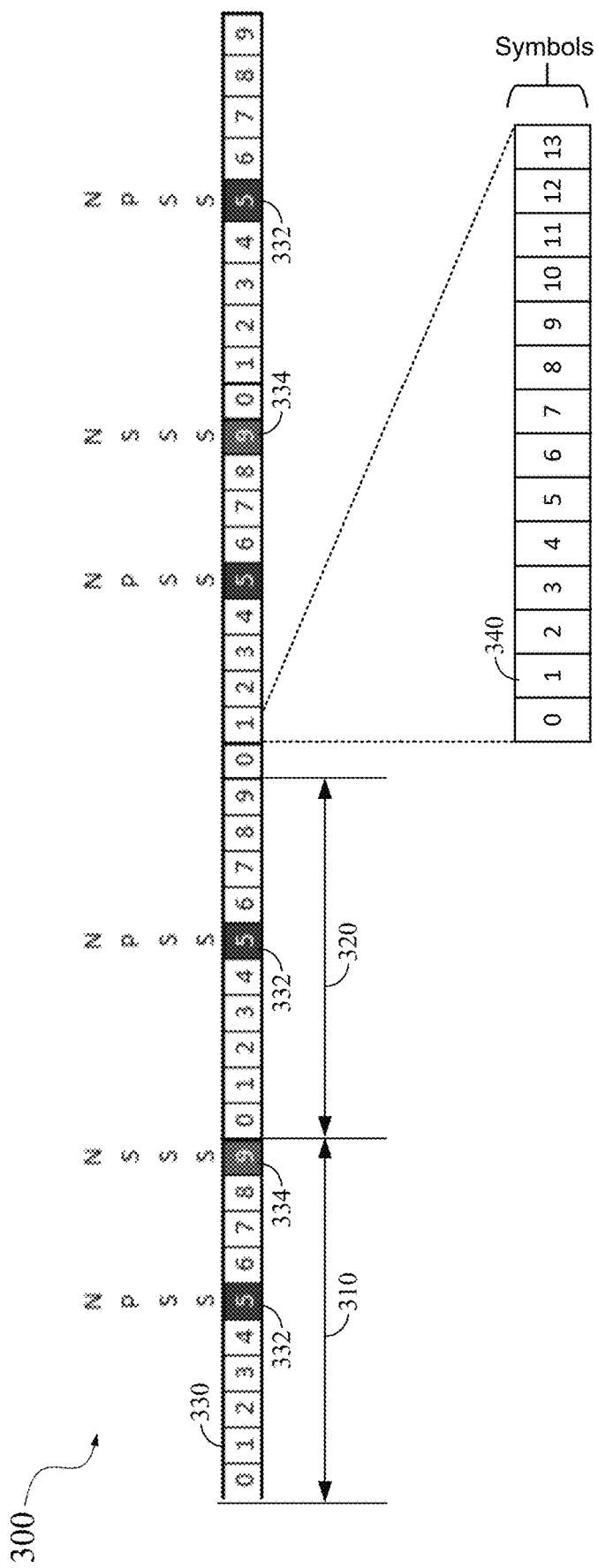
FIG. 3A illustrates an example of a structure of a radio frame for NB-IoT.

FIG. 3A illustrates an example of a structure of a radio frame 300 for NB-IoT. Radio frame 300 shown in FIG. 3A may be used for downlink (DL) or uplink (UL) with subcarrier spacing about 15 KHz. In NB-IoT, a hyperframe cycle may include 1024 hyperframes. Each hyperframe may include 1024 frames (also referred to as system frames or radio frames). Each frame may include 10 subframes (SFs) 330. SFs 330 within each radio frame may be numbered as SF 0, SF 1, SF 2, . . . , and SF 9, and the numbering may be repeated for every system frame. Each subframe 330 may have a duration about 1 ms. Each subframe 330 may include one or more slots, depending on the subcarrier spacing. Each subframe may include 14 orthogonal frequency-division multiplexing (OFDM) symbols 340.

As illustrated in FIG. 3A, each NB-IoT radio frame in the downlink may include 10 subframes 330 and thus may have a total duration about 10 ms. NPSS subframes 332 may be transmitted periodically in subframe 5 of each 10-ms radio frame, while NSSS subframes 334 may be transmitted in subframe 9 of each even-numbered radio frame. For example, in a first radio frame 310 (e.g., frame 0), an NPSS subframe 332 may be sent in subframe 5 and an NSSS subframe 334 may be transmitted in subframe number 9. In a second radio frame 320 (e.g., frame 1), an NPSS subframe 332 may be sent in subframe 5, but no NSSS subframe 334 may be transmitted in second radio frame 320.

Figure 3B:
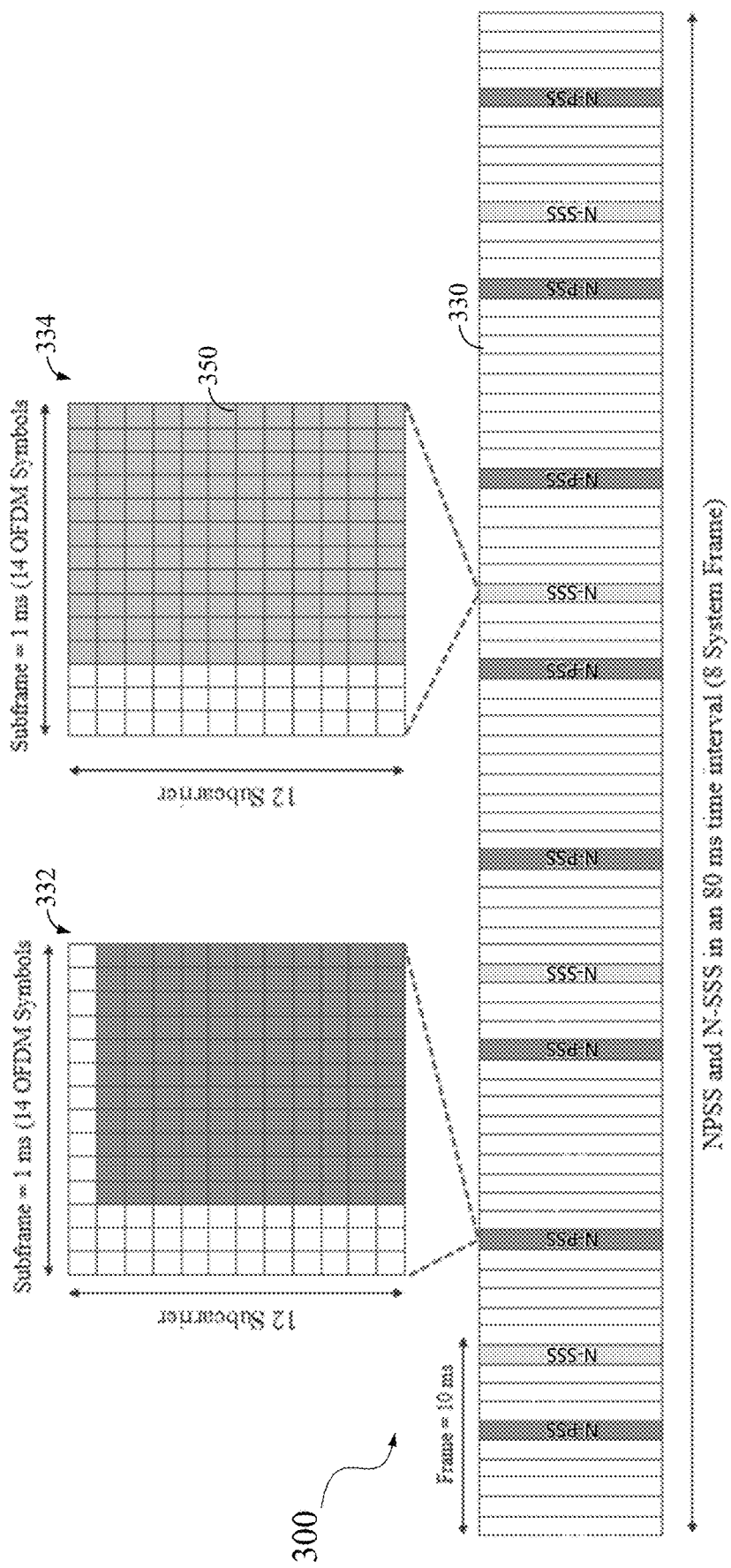
FIG. 3B includes a diagram illustrating structures of Narrowband Primary Synchronization Signal (NPSS) subframes and Narrowband secondary Synchronization Signal (NPSS) subframes in an 80-ms NSSS repetition period.

FIG. 3B includes a diagram 305 illustrating structures of NPSS and NSSS subframes in an 80-ms time interval (the NSSS repetition period). As described above, the system frames may have a period of 10 ms. The NPSS may be sent in subframe 5 in each system frame and may be fixed for all cells of an NB-IoT network. Thus, the NPSS sequence from an eNB may have a duration about 1 ms and a periodicity of about 10 ms. The NSSS may have a periodicity of 80 ms (and may be numbered as mod(SFN #,80)), where four different NSSS sequences (corresponding to 0 ms, 20 ms, 40 ms, 60 ms) may be transmitted in subframes 9 of four even-numbered system frames, consecutively and respectively, during the 80-ms period. Thus, NSSS subframes may be transmitted every 20 ms, and hence the SFN information (e.g., LSBs of an SFN) may be carried by the NSSS subframes in every 20 ms. As such, the SFN information may indicate one of four possible SFN numbers corresponding to offsets of 0 ms, 20 ms, 40 ms, and 60 ms, respectively, in the 80-ms period (including 8 system frames). Therefore, the SFN information carried in each NSSS subframe may indicate the 3 LSBs of the SFN.

FIG. 3B shows the complete OFDM of an NPSS subframe 332 and the complete OFDM of an NSSS subframe 334. In 3GPP standards, the system bandwidth may be divided into multiple (e.g., K) orthogonal subcarriers. A resource grid may be used to represent the time slots and spectrum of each subframe 330. Each subframe 330 may include, for example, a grid of resource elements (REs) 350 spanning multiple subcarriers in the frequency domain and multiple symbols in the time domain. An RE 350 may correspond to one symbol length in the time domain and one subcarrier in the frequency domain. The spacing between adjacent subcarriers may be fixed, and the total number of subcarriers K may depend on the system bandwidth. For example, the spacing of the subcarriers may be 15 KHz, and the minimum resource allocation (a resource block) may include 12 subcarriers, for a total bandwidth of 180 KHz per resource block. Data to be transmitted may be modulated by the subcarriers to generate modulated symbols. The modulated symbols may be sent using, for example, OFDM in the frequency domain, and single-carrier frequency division multiplexing (SC-FDM) in the time domain.

The symbols in each slot may have assigned indices. For example, as shown in FIGS. 3A and 3B, each subframe 330 may include 14 OFDM symbols 340: symb0, symb1, . . . , and symb13. The first three OFDM symbols in every subframe may be used for Long Term Evolution (LTE) Downlink Control Channel (PDCCH). To avoid potential collision with the LTE PDCCH, the first three OFDM symbols are not used in the subframes that carry either NPSS or NSSS. This leaves 11 OFDM symbols per subframe for NPSS and NSSS. As described above, these symbols may be generated from frequency-domain ZC sequences, and then modulated into OFDM waveforms.

The NPSS may be used by UEs to achieve synchronization, in both time and frequency, to an NB-IoT cell. The NPSS may be designed so that it is detectable even with a very large frequency offset. To reduce the UE complexity for NPSS detection, all cells in an NB-IoT network may use the same NPSS. As a result, a UE may only need to search for one NPSS. During the initial cell search, the NPSS may be used by the UE to correct the CFO and detect STO with respect to the subframe boundary, for example, using auto-correlation and cross-correlation methods. Since the NPSS sequence is fixed and is the same for all cells of an NB-IoT network, the NPSS sequence may not carry specific information about an NB-IoT cell.

After performing the time and frequency synchronization using the acquired NPSS, the UE may use the NSSS to detect the cell identity and acquire more information about the frame structure. NB-IoT may support 504 unique PCIDs carried by the NSSS. As described above, the NSSS may have an 80-ms repetition interval, within which four different NSSS sequences are transmitted. The same set of four NSSS sequences is repeated in every 80-ms repetition interval. As also described above, the first 3 OFDM symbols symb0, symb1 and symb2 of an NSSS subframe may not carry any useful information (e.g., may be all zeros) to avoid potential collision with LTE PDCCH. The last 11 OFDM symbols {symb3, symb4, . . . , symb13} in an NSSS subframe may be used to carry the PCID and the SFN information. Each OFDM symbol has 12 REs (or subcarriers) in the frequency domain, where each RE (or subcarrier) may have a bandwidth about, for example, 15 KHz. Thus, the total transmission bandwidth is 12×15 KHz=180 KHz, and the 11 OFDM symbols may include 12×11=132 REs in an NSSS subframe, where each RE is mapped to a 15-KHz subcarrier as shown in FIG. 3B. The NSSS may be used to detect the PCID and the SFN within an ambiguity of 80 ms. The determination of the SFN within the 80-ms NSSS repetition period may enable successful processing of Narrowband Physical Broadcasting Channel (NPBCH). The NSSS subframes are transmitted every 20 ms and each carry one of four SFNs corresponding to offsets of 0 ms, 20 ms, 40 ms, and 60 ms, respectively, in the 80-ms NSSS repetition period.

The NPSS and the NSSS for NB-IoT are described in, for example, 3GPP TS36.211 and TS36.212 standards. As described above, both the NPSS and the NSSS are based on ZC sequences in the frequency domain. The NPSS is constructed from length-11 ZC sequences, while an NSSS sequence may have a length of 132 and may be constructed using an extended ZC sequence, a binary complementary sequence, and a phase shift term (which may be referred to herein as an SFN determination sequence) in the frequency domain. For example, the 132 NSSS REs in an NSSS subframe may be determined according to:

$$s(n)=b_q(n)e^{-j2\pi\theta_l n}\tilde{z}_u(n), \quad (1)$$

where the element index n=0, 1, . . . , and 131, and the sequence index q=0, 1, 2, or 3. Thus, an NSSS sequence for a cell with a cell identity k (e.g., PCID) may be generated using an extended ZC sequence $\tilde{z}_u(n)$, a binary scrambling sequence $b_q(n)$, and a cyclic shift $\theta_l$. Each binary scrambling sequence $b_q(n)$ for n=0, 1, . . . , and 131 and q=0, 1, 2, or 3 may be generated based on a length-128 Walsh-Hadamard sequence $b_q(m)$ for m=0, 1, . . . , and 127, where m=n mode 128 such that the first 4 elements of the length-128 Walsh-Hadamard sequence $b_q(m)$ may be replicated at the end of the length-128 Walsh-Hadamard sequence $b_q(m)$ to generate a length-132 sequence $b_q(n)$. The sequence index q may be determined based on the cell identity k (e.g., PCID) according to:

$$q = \text{floor}\left(\frac{k}{126}\right). \quad (2)$$

Figure 4:
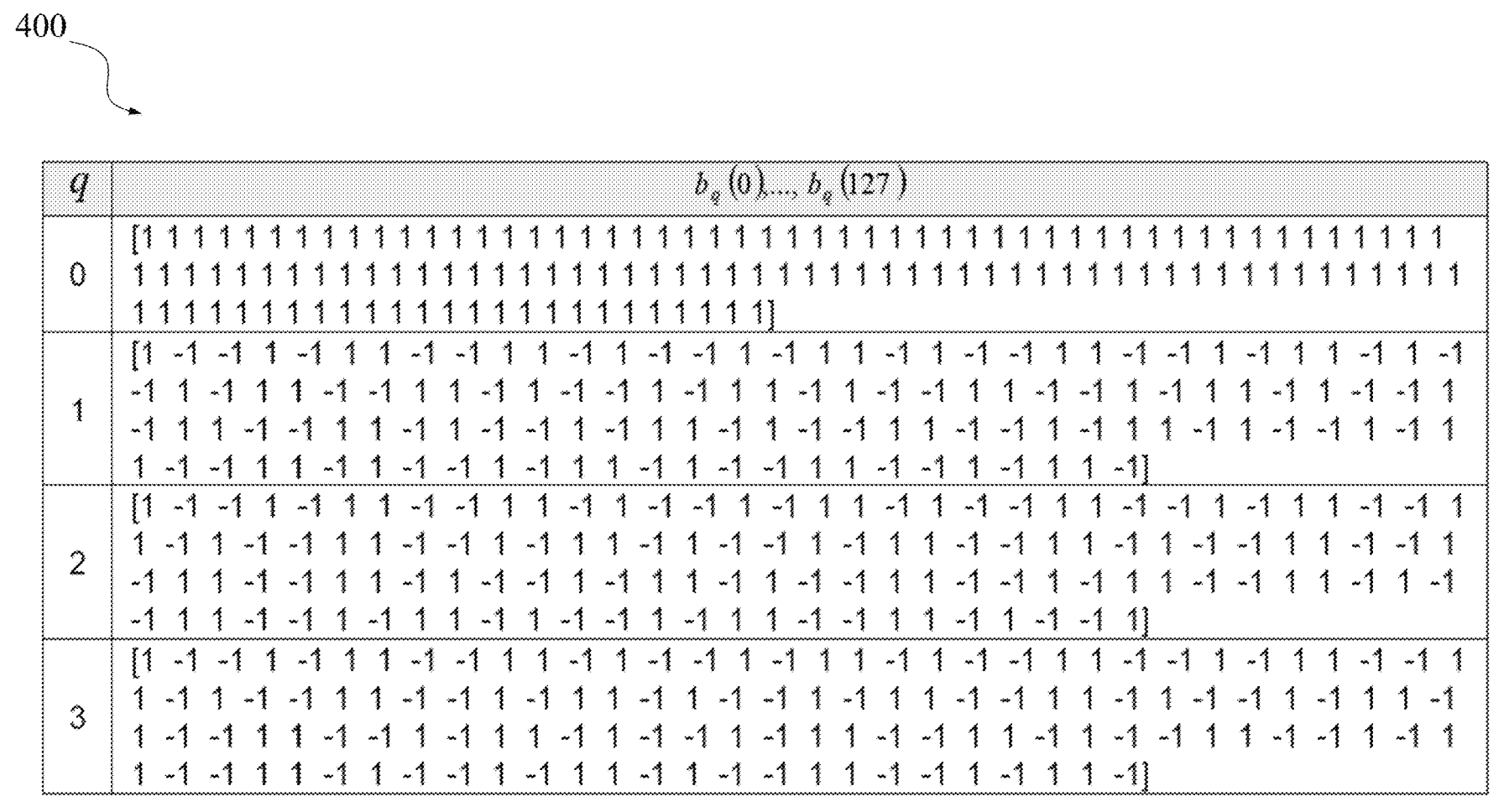

FIG. 4 illustrates examples of length-128 Walsh-Hadamard sequences $b_q(m)$ used for generating binary scrambling sequence $b_q(n)$. As illustrated, FIG. 4 shows four length-128 Walsh-Hadamard sequences $b_q(m)$ for generating four binary scrambling sequences $b_q(n)$ for q=0, 1, 2, and 3. Each length-128 Walsh-Hadamard sequence $b_q(m)$ may include 128 binary values, where each binary value may be +1 or −1. For example, in the first length-128 Walsh-Hadamard sequence $b_q(m)$ (q=0), all values may be 1. The other three length-128 Walsh-Hadamard sequences $b_q(m)$ (q=1, 2, and 3) shown in FIG. 4 may include values of +1 and −1. The four Walsh-Hadamard sequences $b_q(m)$ are orthogonal sequences.

The extended ZC sequence $\tilde{z}_u(n)$ in Equation (1) may be generated by first generating a length-131 ZC sequence $z_u(n)$ of root u according to:

$$z_u(n) = e^{\frac{-ju\pi n(n+1)}{131}}, \quad (3)$$

where n=0, 1, . . . , and 130, and the root u is determined using the cell identity k according to:

$$u=(k \bmod 126)+3. \quad (4)$$

The length-131 ZC sequence $z_u(n)$ may be extended to length-132 by replicating the first element according to:

$$\tilde{z}_u(n)=z_u(n \bmod 131) \text{ for } n=0,1,\ldots,131. \quad (5)$$

For a same cell, all NSSS sequences share the same binary scrambling sequence $b_q(n)$ and the same extended ZC sequence $\tilde{z}_u(n)$ because the sequence index q and the root u are determined using the same cell identity k. Within an 80-ms period (the NSSS repetition interval), there may be 4 NSSS sequences transmitted in four NSSS subframes, where the NSSS sequences may be differentiated by different cyclic shift $$\theta_l = \frac{33}{132}\left(\frac{k}{2}\bmod 4\right) = \frac{33}{132}l \text{ for } l \in$$

{0,1,2,3}. Therefore, the first NSSS sequence may have a cyclic shift $\theta_l=0$ for l=0 and SFN corresponding to a time offset of 0 ms in an 80-ms NSSS repetition period, the second NSSS sequence may have a cyclic shift $\theta_l=0.25$ for l=1 and SFN corresponding to a time offset of 20 ms in the 80-ms NSSS repetition period, the third NSSS sequence may have a cyclic shift $\theta_l=0.5$ for l=2 and SFN corresponding to a time offset of 40 ms in the 80-ms NSSS repetition period, and the fourth NSSS sequence may have a cyclic shift $\theta_l=0.75$ for l=3 and SFN corresponding to a time offset of 60 ms in the 80-ms NSSS repetition period.

Therefore, the NSSS may be used by a UE to unambiguously identify the cell identity by matching the received NSSS with the ideal NSSS generated based on the binary scrambling sequences $b_q(n)$ and the extended ZC sequences $\tilde{z}_u(n)$ using, for example, Maximum Likelihood (ML) search-based methods. The NSSS may also allow frame synchronization within the 80-ms NSSS repetition period by matching the cyclic shift $\theta_l$. Because the duration of a system frame is 10 ms, the UE may effectively know the three LSBs of the SFN by identifying a system frame in the 80-ms repetition interval (including 8 system frames).

To determine the cell identity and SFN, the transmitted NSSS sequence s(n) may be rewritten as:

$$s(n)=\{b_q(n)\tilde{z}_u(n)\}\{e^{-j2\pi\theta_l n}\}, \text{ where } n=0,1,\ldots,131, \quad (6)$$

and may be broken down into two elements $s_1(n)$ and $s_2(n)$ as follows:

$$s(n)=s_1(n)s_2(n), \quad (7)$$

where $s_1=\{b_q(n)\tilde{z}_u(n)\}$ and $s_2=\{e^{-j2\pi\theta_l n}\}$. Element $s_1$ may represent the sequence for determining the PCID (referred to as the PCID sequence). As described above with respect to Equation (4), there may be 126 different root u values, where root u=0, 1, . . . , 125. For each root-index u, $\tilde{z}_u(n)$ may include 132 values for n=0, 1, . . . , 131. Therefore, $\tilde{z}_u(n)$ may be represented by a 132×126 matrix P for each sequence index q. Because the root u is determined based on the cell identity k as described above with respect to Equation (4), each column of the 126 columns in matrix P may represent a unique PCID k. The matrix P may be expanded to four different matrices for the four sequence indices q, where each matrix of the four matrices may be generated using matrix P and a binary scrambling sequence $b_q(n)$ (for q=0, 1, 2, or 3 and n=0, 1, 2, ..., 131) according to: $P_0=b_0P$, $P_1=b_1P$, $P_2=b_2P$, and $P_3=b_3P$. The dimension of each matrix $P_0$, $P_1$, $P_2$, or $P_3$ may be the same as matrix P (i.e., 132×126). Because q is also a function of the cell identity k as shown by Equation (2), matrices $P_0$, $P_1$, $P_2$, and $P_3$ may correspond to different PCIDs. The 4 matrices $P_0$, $P_1$, $P_2$, and $P_3$ may be concatenated to form a PCID matrix $Q=[P_0, P_1, P_2, P_3]$, where PCID matrix Q may have a size of 132×504 (denoted as $Q_{132\times504}$) and may including 504 column vectors corresponding to 504 unique PCIDs. Since the binary scrambling sequences $b_0$, $b_1$, $b_2$, $b_3$ are orthogonal sequences, matrices $P_0$, $P_1$, $P_2$, $P_3$ are also orthogonal.

Element $s_2$ may be SFN determination sequences and may be generated using:

$\theta_l=0$ for $l=0, n=0,1, \ldots, 131$, and SFN corresponding to 0 ms, $\theta_l=0.25$ for $l=1, n=0,1, \ldots, 131$, and SFN corresponding to 20 ms, $\theta_l=0.5$ for $l=2, n=0,1, \ldots, 131$, and SFN corresponding to 40 ms, and $\theta_l=0.75$ for $l=3, n=0,1, \ldots, 131$, and SFN corresponding to 60 ms. (8)

Thus, the ideal SFN determination sequences may include:

$s_{2,0}=e^{-j2\pi 0n}$, for $n=0,1, \ldots, 131$, and SFN corresponding to 0 ms, $s_{2,1}=e^{-j2\pi n/4}$, for $n=0,1, \ldots, 131$, and SFN corresponding to 20 ms, $s_{2,2}=e^{-j2\pi n/2}$, for $n=0,1, \ldots, 131$, and SFN corresponding to 40 ms, and $s_{2,3}=e^{-j2\pi 3/4}$, for $n=0,1, \ldots, 131$, and SFN corresponding to 60 ms. (9)

The above four ideal SFN determination sequences $s_{2,0}$, $s_{2,1}$, $s_{2,2}$, and $s_{2,3}$ are orthogonal, and the transmitted SFN determination sequence $s_2 \in \{s_{2,0}, s_{2,1}, s_{2,2}, s_{2,3}\}$. Therefore, the correlation of a received SFN determination sequence $s_2$ with ideal SFN determination sequences $s_{2,0}$, $s_{2,1}$, $s_{2,2}$, and $s_{2,3}$ may yield a correlation peak signal that indicate $\theta_l$ and thus the SFN (more specifically, the 3 LSBs of the SFN). For example, if the correlation of the received SFN determination sequence $s_2$ with ideal SFN determination sequences $s_{2,0}$ is the highest, the SFN of the received SFN determination sequence $s_2$ may correspond to 0 ms ($\theta_l=0$). If the correlation of the received SFN determination sequence $s_2$ with ideal SFN determination sequences $s_{2,1}$ is the highest, the SFN of the received SFN determination sequence $s_2$ may correspond to 20 ms ($\theta_l=0.25$), and so on.

Figure 5A:
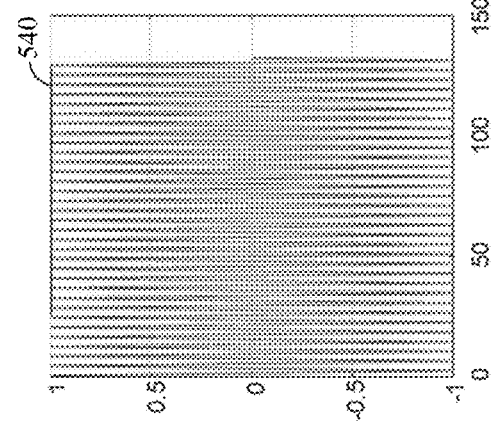
FIGS. 5A and 5B illustrate a time domain signal and the corresponding frequency domain signal (e.g., power spectrum or periodogram), respectively, of an example of an ideal System Frame Number (SFN) determination sequence corresponding to the first system frame (offset=0 ms) in an 80-ms NSSS repetition period.

FIG. 5A includes a diagram 510 illustrating the time domain signal of an ideal SFN determination sequence $s_{2,0}$ in the first system frame (corresponding to 0 ms and l=0) of an 80-ms time interval. The ideal SFN determination sequence $s_{2,0}$ may be generated according to Equation (9). As described above with respect to Equation (9), for l=0, the time domain signal of the ideal SFN determination sequence $s_{2,0}$ may be a constant value such as "1", and thus may be a sinusoidal signal with a frequency (or cyclic shift $\theta_l$) about 0.

Figure 5B:
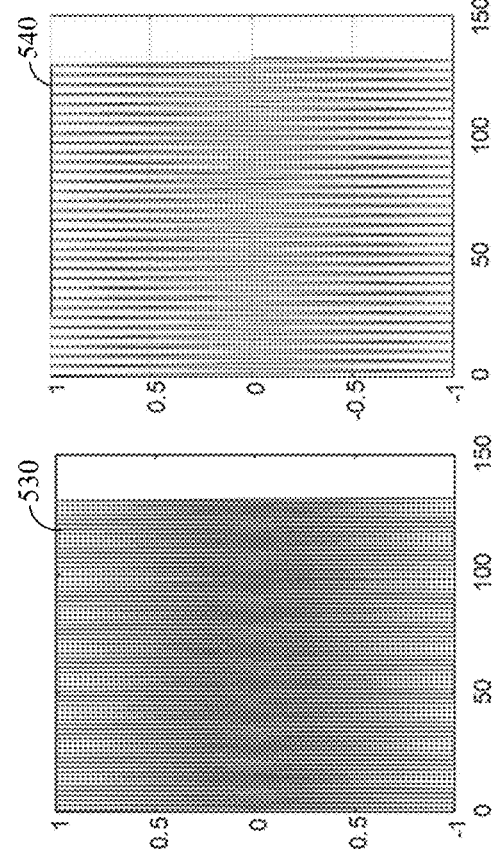

FIG. 5B includes a diagram 515 illustrating the (magnitude or power) spectrum of the ideal SFN determination sequence $s_{2,0}$ in the first system frame (corresponding to 0 ms and l=0) of an 80-ms time interval as shown in FIG. 5A.

The spectrum may be generated by performing DFT (e.g., FFT) on the ideal SFN determination sequence $s_{2,0}$ shown in FIG. 5A, and determining the magnitude or the power (e.g., magnitude-squared) of each frequency bin of the DFT results. In FIG. 5B, the DC signal is centered. Therefore, the spectrum of the SFN determination sequence includes a peak at the center of the spectrum (DC centered).

Figure 5C:
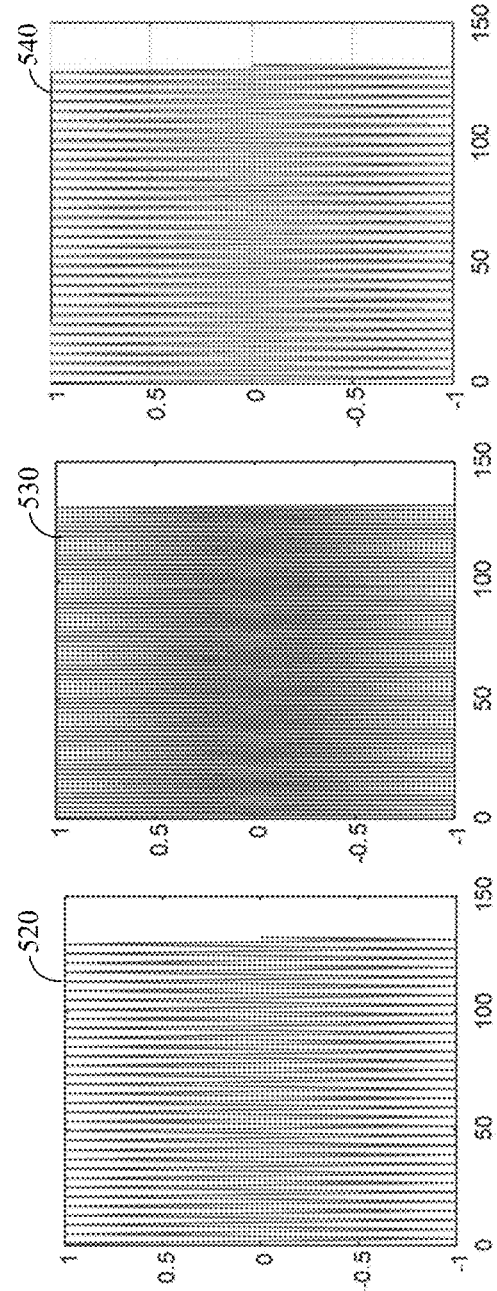
FIGS. 5C and 5D illustrate the time domain signal and the corresponding frequency domain signal, respectively, of an example of an ideal SFN determination sequence corresponding to the third system frame (offset=20 ms) in an 80-ms NSSS repetition period.
Figure 5D:
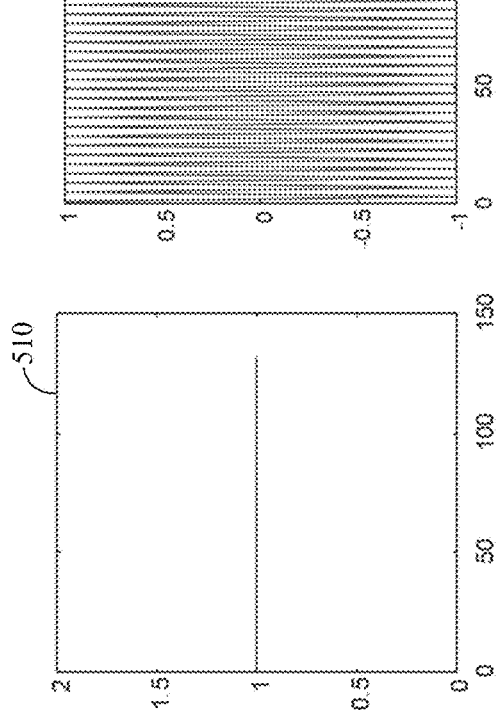

FIG. 5C includes a diagram 520 illustrating the time domain signal of an ideal SFN determination sequence $s_{2,1}$ in the third system frame (corresponding to 20 ms and l=1) of an 80-ms time interval. The ideal SFN determination sequence $s_{2,1}$ may be generated using Equations (9). As described above with respect to Equation (9), for l=1, the time domain signal of ideal SFN determination sequence $s_{2,1}$ may be a sinusoidal signal with a frequency (or cyclic shift $\theta_l$) about 0.25. FIG. 5D includes a diagram 525 illustrating the DC-centered (magnitude or power) spectrum of the ideal SFN determination sequence $s_{2,1}$ in the third system frame (corresponding to 20 ms and l=1) of an 80-ms time interval as shown in FIG. 5C. The spectrum shown in FIG. 5D may be generated by performing DFT (e.g., FFT) on the ideal SFN determination sequence $s_{2,1}$ shown in FIG. 5C, and determining the magnitude or the power (e.g., magnitude-squared) of each frequency bin of the DFT results.

Figure 5E:
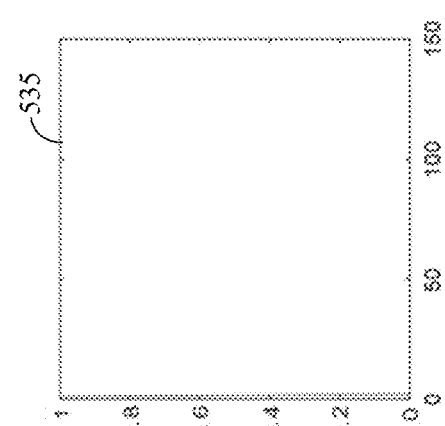
FIGS. 5E and 5F illustrate the time domain signal and the corresponding frequency domain signal, respectively, of an example of an ideal SFN determination sequence corresponding to the fifth system frame (offset=40 ms) in an 80-ms NSSS repetition period.
Figure 5F:
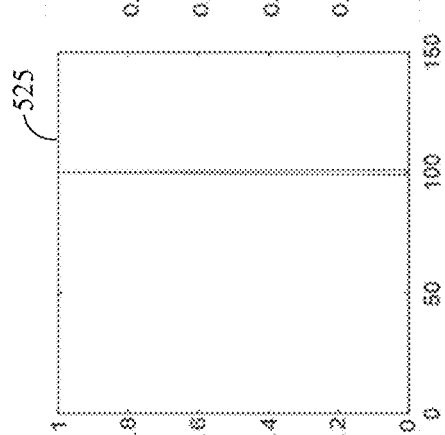

FIG. 5E includes a diagram 530 illustrating the time domain signal of an ideal SFN determination sequence $s_{2,2}$ in the fifth system frame (corresponding to 40 ms and l=2) of an 80-ms time interval. The ideal SFN determination sequence $s_{2,2}$ may be generated using Equations (9). As described above with respect to Equation (9), for l=2, the time domain signal of an ideal SFN determination sequence $s_{2,2}$ may be a sinusoidal signal with a frequency (or cyclic shift $\theta_l$) about 0.5. FIG. 5F includes a diagram 535 illustrating the DC-centered (magnitude or power) spectrum of the ideal SFN determination sequence $s_{2,2}$ in the fifth system frame (corresponding to 40 ms and l=2) of an 80-ms time interval as shown in FIG. 5E. The spectrum shown in FIG. 5F may be generated by performing FFT on the ideal SFN determination sequence $s_{2,2}$ shown in FIG. 5E, and determining the magnitude or the power (e.g., magnitude-squared) of each frequency bin of the DFT results.

Figure 5G:
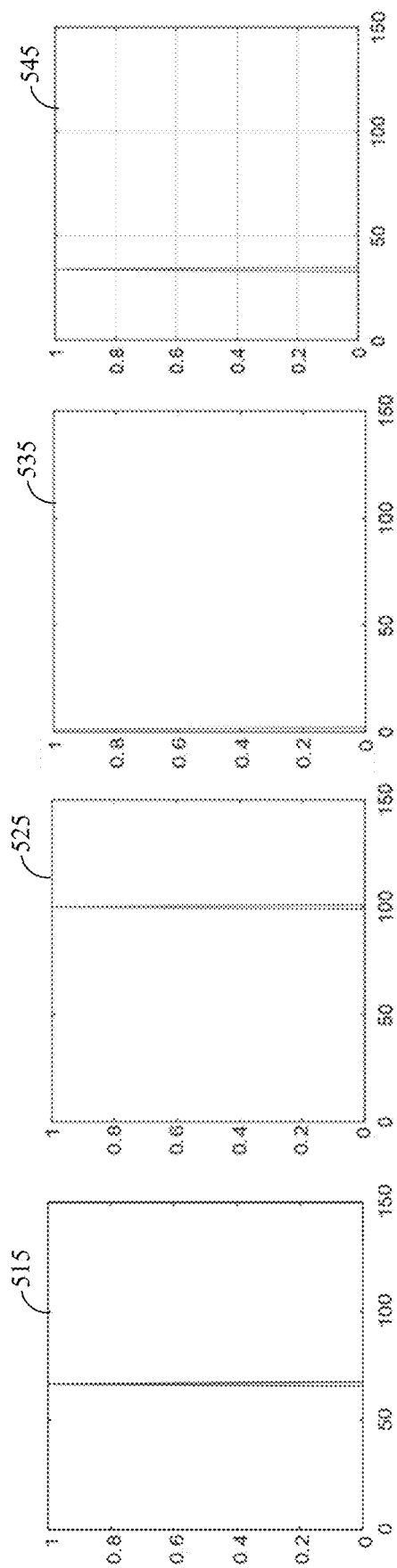
FIGS. 5G and 5H illustrate the time domain signal and the corresponding frequency domain signal, respectively, of an example of an ideal SFN determination sequence corresponding to the seventh system frame (offset=60 ms) in an 80-ms NSSS repetition period.
Figure 5H:
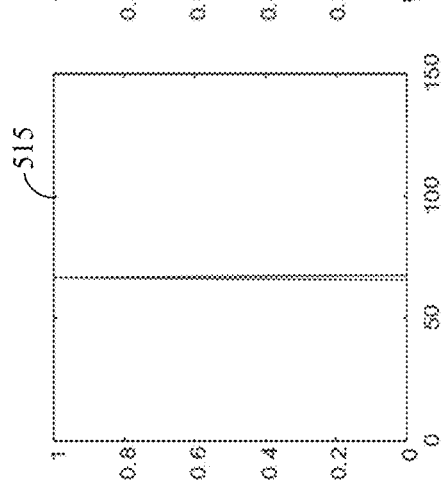

FIG. 5G includes a diagram 540 illustrating the time domain signal of an ideal SFN determination sequence $s_{2,3}$ in the seventh system frame (corresponding to 60 ms and l=3) of an 80-ms time interval. The ideal SFN determination sequence $s_{2,3}$ may be generated using Equations (9). As described above with respect to Equation (9), for l=3, the time domain signal of an ideal SFN determination sequence $s_{2,3}$ may be a sinusoidal signal with a frequency (or cyclic shift $\theta_l$) about 0.75. FIG. 5II includes a diagram 535 illustrating the DC centered spectrum of the ideal SFN determination sequence $s_{2,3}$ in the seventh system frame (corresponding to 60 ms and l=3) of an 80-ms time interval as shown in FIG. 5G. The spectrum shown in FIG. 5H may be generated by performing FFT on the ideal SFN determination sequence $s_{2,3}$ shown in FIG. 5G.

Because SFN determination sequences $s_{2,0}$, $s_{2,1}$, $s_{2,2}$, and $s_{2,3}$ may be sinusoidal signals of different frequencies or cyclic shifts $\theta_l$ (e.g., 0, 0.25, 0.5, and 0.75), the peak signals of SFN determination sequences $s_{2,0}$, $S_{2,1}$, $s_{2,2}$, and $s_{2,3}$ may be at different locations (e.g., frequency bins) in the frequency domain (e.g., generated by performing Fourier transform on the time domain signal). Thus, the SFN in the 80-ms time interval (i.e., the 3 LSBs of the SFN) may be determined by performing Fourier transform on the received time domain SFN determination sequence to generate a magnitude or power spectrum of the received time domain SFN determination sequence, and identifying the frequency zone within which the peak signal of the magnitude or power spectrum of the received time domain SFN determination sequence may appear.

Figure 6:
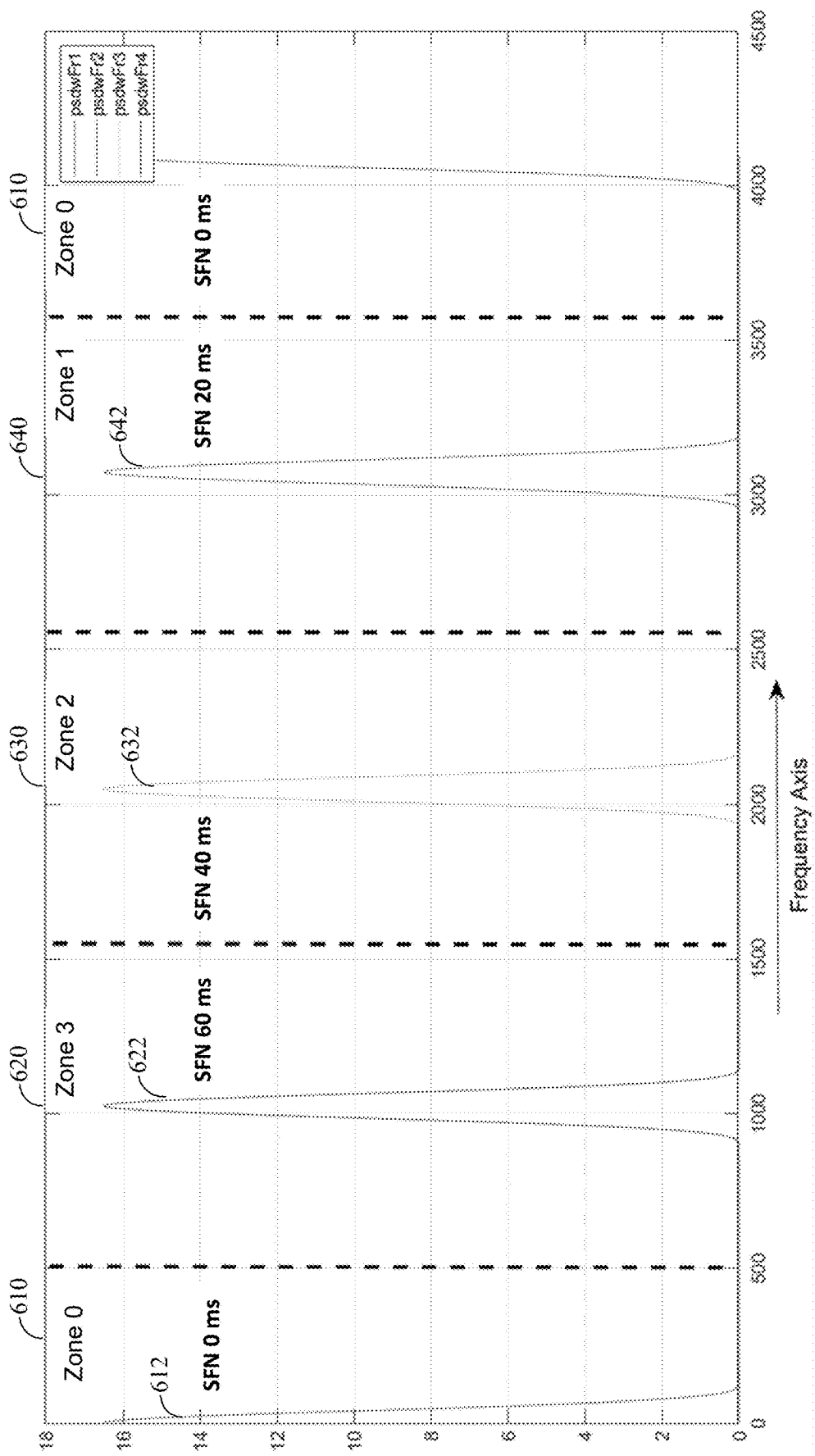
FIG. 6 illustrates an example of partitioning the frequency range of a power spectrum of an SFN determination sequence into four frequency zones corresponding to four respective SFN numbers in an 80-ms NSSS repetition period, where the peak of the power spectrum of the SFN determination sequence may fall within one of the 4 frequency zones.

FIG. 6 illustrates an example of partitioning the frequency range of a power spectrum of an SFN determination sequence into four zones corresponding to four SFN numbers (corresponding to offsets of {0 ms, 20 ms, 40 ms, 60 ms}) in an 80-ms time interval, where the peak of the power spectrum of the SFN determination sequence may fall within one of the 4 frequency zones. Frequency zone 0 (610) may be centered around a peak signal 612 of the power spectrum of SFN determination sequences $s_{2,0}$ and may correspond to an SFN with a 0-ms offset ($\theta_f=0$) in the 80-ms time interval. Frequency zone 1 (640) may be centered around a peak signal 642 of the power spectrum of SFN determination sequences $s_{2,1}$ and may correspond to an SFN with a 20-ms offset=0.25) in the 80-ms time interval. Frequency one 2 (630) may be centered around a peak signal 632 of the power spectrum of SFN determination sequences $s_{2,2}$ and may correspond to an SFN with a 40-ms offset=0.5) in the 80-ms time interval. Frequency zone 3 (620) may be centered around a peak signal 622 of the power spectrum of SFN determination sequences $s_{2,3}$ and may correspond to an SFN with a 60-ms offset=0.75) in the 80-ms time interval.

Therefore, under high SNR conditions, the SFN information may be estimated by performing FFT on the SFN determination sequence in the received NSSS sequence to generate a magnitude or power spectrum of the received SFN determination sequence, and determining the frequency zone in which the peak signal of the spectrum of the received SFN determination sequence may be located. Under very low SNR conditions, such as SNR<=−7 dB (e.g., below up to about −20 dB), it may be difficult to correctly identify the peak signal in the spectrum that corresponds to the received SFN determination sequence because the signal level of the SFN determination sequence may be close to the noise floor or the signal levels of some interference signals. Therefore, the method described above may give false or inconclusive SFN estimation results.

According to certain embodiments, a method of determining the SFN within the 80-ms NSSS repetition period and a method of determining the CFO in very low SNR conditions are disclosed. As described above, in NB-IoT, the NSSS may have a periodicity of 80 ms, and may carry information that may be used to determine the offset (e.g., 0 ms, 20 ms, 40 ms, or 60 ms) of the SFN in the 80-ms NSSS repetition period and thus the 3 LSBs of the SFN. The methods disclosed herein equalize the received synchronization signal (e.g., NSSS) sequence using detected PCID information, and perform windowing and Fourier transforms on overlapped segments of the equalized synchronization signal sequence to enhance and detect the peak signal in the averaged magnitude or power spectrum (e.g., periodogram) of the overlapped segments of the equalized synchronization signal sequence, where the location of the peak signal in the averaged spectrum may indicate one of the 4 possible offsets{0, 20 ms, 40 ms, 60 ms} of the received NSSS subframe in the 80-ms NSSS repetition period. In some embodiments, based on the estimated SFN information, a high-order DFT (e.g., 4096-point FFT) that may provide a high resolution in the frequency domain may be performed on a corresponding segment of the equalized synchronization signal sequence, and the CFO may be estimated based on an offset between the ideal SFN peak and a peak in the spectrum generated using the high-order DFT. Techniques disclosed herein may determine SFN and CFO under very low SNR conditions, such as SNR between about −7 dB and about −20 dB or lower.

As described above, the transmitted NSSS sequence may be represented by $s(n)=s_1(n)s_2(n)$, where $s_1(n)$ carries the PCID information and $s_2(n)$ carries the SFN information. In the transmitter, the NSSS sequence s(n) for n=0, 1, . . . , and 131 may be mapped onto the 132 REs (11 symbols each having 12 subcarriers) of an NSSS subframe. As shown in FIGS. 3A and 3B, the 11 symbols are numbered as symb3, symb4, . . . , and symb13. The first 3 symbols symb0, symb1, and symb2 in the NSSS subframe may not carry any useful information (e.g., may be all zeros) in order to avoid potential collision with LTE PDCCH. The 14 symbols are OFDM modulated (e.g., by taking the IFFT of each OFDM modulated symbol). For each symbol, a Cyclic Prefix (CP) may be prefixed according to the 3GPP standards. As such, a subframe with 14 OFDM symbols (e.g., with a total duration about 1 ms) in the time domain is formed. The OFDM symbols may be half-carrier shifted before being transmitted by the RF subsystem of an eNB or another base station. The UE's RF subsystem (e.g., a wireless receiver of a wireless transceiver) may receive the NSSS subframe, where the received NSSS sequence may include noises such as additive white Gaussian noise (AWGN) and/or interference noises. The received NSSS subframe may be half-carrier shifted in a process that may be inverse to the half-carrier shift process performed by the eNB, followed by the OFDM demodulation of each OFDM symbol of symb3, symb4, . . . , and symb13. The 11 symbols each including 12 subcarriers may be mapped to a single column of 132 elements representing the received NSSS sequence. Each element of the received NSSS sequence may be represented by:

$$y(n)=h(n)s(n)+v(n), n=0,1, \ldots, 131, \text{ or}$$

$$y(n)=h(n)s_1(n)s_2(n)+v(n), n=0,1, \ldots, 131, \quad (10)$$

where v(n) is the AWGN added along the propagation channel, and h(n) is the channel coefficient for the transmitted NSSS sequence s(n). y(n) may be rewritten as a 132×1 vector Y (e.g., a column vector) according to:

$$Y=HS1S2+V. \quad (11)$$

Vector Y may carry PCID information (in S1) and SFN information (in S2). S1 may be one of the 504 PCID column vectors of matrix $Q_{132\times504}=[Q_0, Q_1, \ldots, Q_{503}]$ described above.

To determine the SFN, the PCID may need to be determined first. To determine the PCID, vector Y may be correlated with all 504 column vectors of Q, for example, by performing a matrix operation $Z=Q^H Y$, where Z may be a 504×1 column vector $[z_0, z_1, \ldots, z_{503}]^T$. The magnitudes of the elements of vector Z indicate the degrees of correlation of the received NSSS sequence with the 504 PCID column vectors of matrix $Q_{132\times504}$. The index of the element of vector Z having the maximum magnitude value may indicate the PCID k of the eNB or another base station that transmits the NSSS subframe, where max $(Z)=abs(z_k)$, $k\in\{0, 1, \ldots, 503\}$ is the estimated value of the PCID, and the estimated ideal PCID column vector is $S_1(k)$ (e.g., $Q_k$). The estimated ideal PCID vector $S_1(k)$ may be the same as S1 if the PCID is correctly estimated.

To determine the SFN within the 80-ms NSSS repetition interval, which may correspond to a possible offset $\theta^f\in\{0$ ms, 20 ms, 40 ms, 60 ms}, vector Y may be processed (e.g., equalized or normalized) using the estimated ideal PCID vector $S_1(k)$ (which may be the same as S1) according to:

$$Y/S1 = H \cdot S1S2/S1 + V/S1. \tag{12}$$

Equation (12) may be rewritten as:

$$Y' = HS2 + V', \tag{13}$$

where Y' may be referred to as the equalized (or normalized) NSSS sequence. As such, S2 may be estimated according to:

$$\hat{S}2 = Y'/H - V'/H, \tag{14}$$

where $\hat{S}2$ is the estimation of S2. In the presence of channel distortion H and noise V, estimating S2 according to Equation (14) may not enable the proper identification of the SFN under low SNR conditions.

As described above with respect to Equation (9), there may be 4 different S2 sequences $s_{2,0}(n)$, $s_{2,1}(n)$, $s_{2,2}(n)$, and $s_{2,3}(n)$ that carry four different SFNs (corresponding to offsets of 0 ms, 20 ms, 40 ms, and 60 ms). These four sequences for SFN determination (referred to as SFN determination sequences) are orthonormal, and may each form a 132×1 column vector $S_{2,0}$, $S_{2,1}$, $S_{2,2}$, or $S_{2,3}$. The four 132×1 column vectors representing the four SFN determination sequences may be concatenated to form a matrix $R=[S_{2,0}, S_{2,1}, S_{2,2}, or S_{2,3}]$, where matrix R may be a 132×4 orthogonal matrix and $R^H R$ is a diagonal matrix. The estimated $\hat{S}2$ may be correlated with the 4 columns of matrix R through inner product according to:

$$r = [\hat{S}2^H S_{2,0}, \hat{S}2^H S_{2,1}, \hat{S}2^H S_{2,2}, \hat{S}_2^H S_{2,3}], \tag{15}$$

or $$r = [r_0, r_1, r_2, r_3], \tag{16}$$

where $r_0 = abs(\hat{S}2^H S_{2,0})$, $r_1 = abs(\hat{S}2^H S_{2,1})$, $r_2 = abs(\hat{S}2^H S_{2,2})$, and $r_3 = abs(\hat{S}2^H S_{2,3})$. The SFN within the 80-ms NSSS repetition period may be determined based on which one of $r_0$, $r_1$, $r_2$, and $r_3$ has the largest value max(r) among the elements of r. If $r_0 = max(r)$, then the SFN may correspond to 0 ms of 80-ms NSSS repetition period. If $r_1 = max(r)$, then the SFN may correspond to 20 ms of the 80-ms NSSS repetition period. If $r_2 = max(r)$, then the SFN may correspond to 40 ms of the 80-ms NSSS repetition period. If $r_3 = max(r)$, then the SFN may correspond to 60 ms of the 80-ms NSSS repetition period.

Under very low SNR conditions, such as SNR between about −7 dB and about −20 dB or lower, the estimates $r_0$, $r_1$, $r_2$, and $r_3$ may give false and/or inconclusive results of the SFN estimation, and thus the correlation method may fail in such low SNR conditions. To suppress the noise, techniques disclosed herein perform overlapped segmentation of the received (and equalized or normalized) NSSS sequence, apodization (e.g., windowing) of the overlapped segments, DFTs of the apodized overlapped segments, and magnitude squaring and averaging of the results of the DFTs, to enhance the true peak signal representing the NSSS sequence in the frequency domain. The apodization (e.g., windowing) may be performed using an apodization function, such as a Hanning window 700 shown in FIG. 7 or another windowing function (e.g., Blackman window, Welch window, sine/cosine window, Nuttall window, Gaussian window, Bartlett window, or Blackman-Harris window), to gradually bring the values of the segment elements to zero at both ends of the segment.

Figure 8:
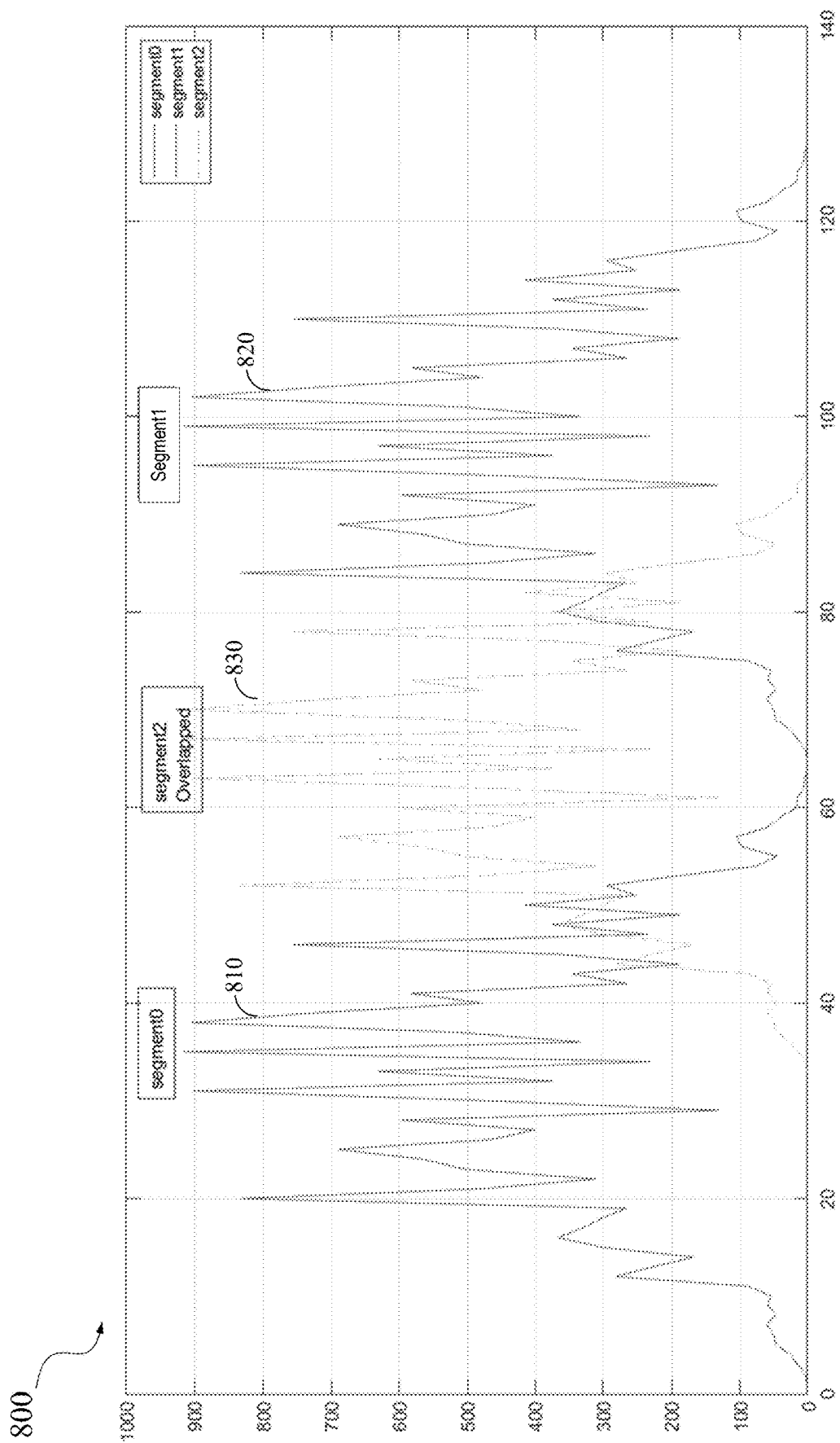
FIG. 8 includes a diagram illustrating examples of windowed segments of an SFN determination sequence according to certain embodiments.

FIG. 8 includes a diagram 800 illustrating examples of windowed segments of the estimated SFN determination sequence $\hat{S}2$ according to certain embodiments. As described above, the estimated SFN determination sequence $\hat{S}2$ may be the equalized (or normalized) NSSS sequence determined using, for example, Equations (11)-(14). In the illustrated example, the estimated SFN determination sequence $\hat{S}2$ may be represented by $\hat{S}2 = [x_0, x_1, \ldots, x_{131}]^T$, and may be partitioned into multiple segments, such as segment-0 $\hat{S}_0 = [x_0, x_1, \ldots, x_{65}]^T$, segment-1 $\hat{S}_1 = [x_{66}, x_{67}, \ldots, x_{131}]^T$, and segment-2 $\hat{S}_2 = [x_{33}, x_{34}, \ldots, x_{98}]^T$. Segment-2 $\hat{S}_2$ may overlap with both segment-0 and segment-1. In some embodiments, the estimated SFN determination sequence $\hat{S}2$ may be partitioned into four or more overlapped segments. The overlap between two consecutive segments may be greater than 0 and may be equal to or less than a half of each segment.

Figure 7:
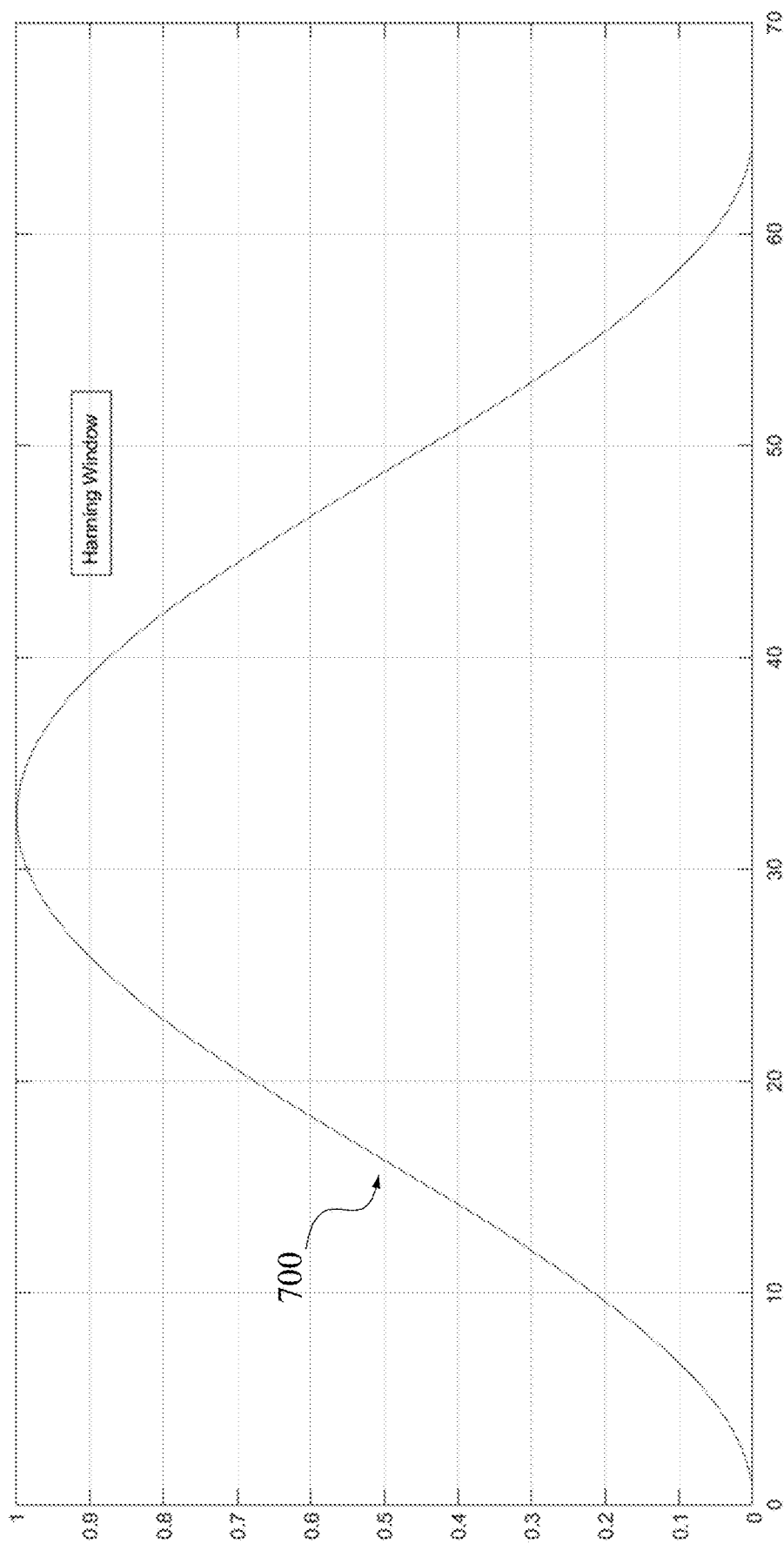
FIG. 7 illustrates an example of a Hanning window for windowing segments of an SFN determination sequence according to certain embodiments.

In the illustrated example, a window W, such as Hanning window 700 shown in FIG. 7, may be applied to the multiple overlapped segments by element-wise multiplication of the segment elements with the window elements according to, for example:

$$\hat{S}_0' = \hat{S}_0 \cdot W,$$

$$\hat{S}_1' = \hat{S}_1 \cdot W, \text{ and,}$$

$$\hat{S}_2' = \hat{S}_2 \cdot W. \tag{17}$$

In the illustrated example where the estimated SFN determination sequence $\hat{S}2$ is partitioned into three overlapped, equal-sized segments each having a size of 66, the size of the window W may be about 66 ($W = [w_0, w_1, \ldots, w_{65}]^T$). In examples where the estimated SFN determination sequence $\hat{S}2$ is partitioned differently, the size of the window W may be different from 66, and may be the same as the size of each segment. Overlapped, windowed segments $\hat{S}_0'$, $\hat{S}_1'$, and $\hat{S}_2'$ are shown by data sequences 810, 820, and 830, respectively, in FIG. 8.

FFT operations (e.g., 128-point FFT operations) may then be performed on the overlapped, windowed segments $\hat{S}_0'$, $\hat{S}_1'$, and $\hat{S}_2'$. The results of the FFT operation for each windowed segment may be processed (e.g., squared and averaged) as follows to generate the power (or magnitude) spectra $F_s^0$, $F_s^1$, and $F_s^2$ (e.g., periodograms) and the averaged power (or magnitude) spectrum F (e.g., a periodogram) of overlapped, windowed segments $\hat{S}_0'$, $\hat{S}_1'$, and $\hat{S}_2'$:

$$F_s^0 = abs(fft(\hat{S}_0 \cdot W)),$$

$$F_s^1 = abs(fft(\hat{S}_1 \cdot W)), \tag{18}$$

$$F_s^2 = abs(fft(\hat{S}_2 \cdot W)), \text{ and}$$

$$F = (F_s^0 + F_s^1 + F_s^2)/3.$$

F may be a sequence with a length of 132, and may be partitioned into 4 zones as shown in, for example, FIG. 6. The max(F) may be a peak corresponding to the estimated SFN determination sequence $\hat{S}2$. Depending on the zone in which the peak max(F) of F is located, the SFN number may be determined, for example, as described above with respect to FIG. 6 and described below with respect to FIG. 9.

Figure 9:
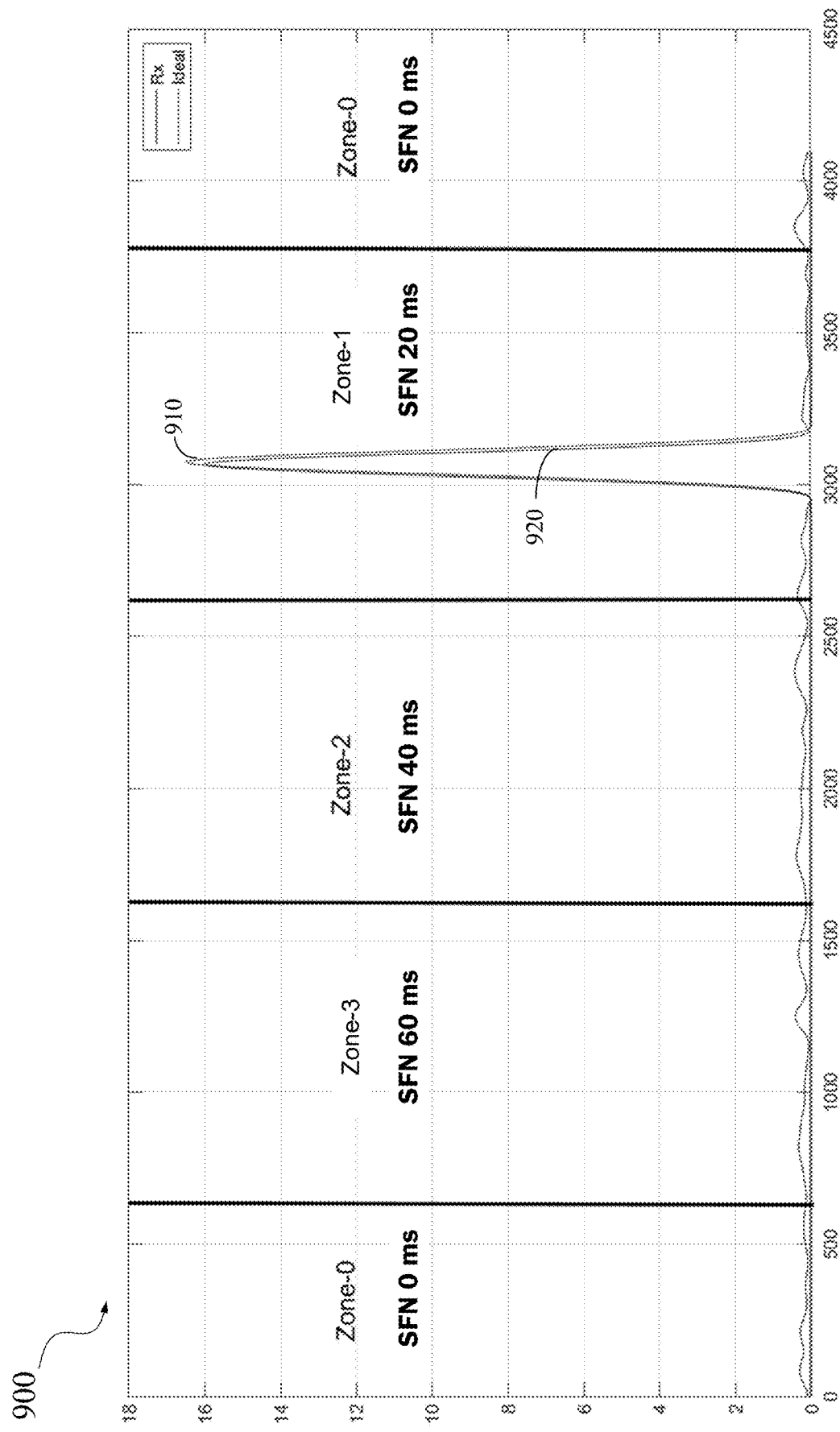
FIG. 9 illustrates an example of estimating the SFN based on four frequency zones of a power spectrum corresponding to four different SFNs, and the location of the peak of the power spectrum of the received SFN determination sequence determined using techniques disclosed herein according to certain embodiments.

FIG. 9 illustrates an example of estimating the SFN based on four frequency zones of a power spectrum corresponding to four different SFNs and the location of the peak of the power spectrum of the received SFN determination sequence determined using techniques disclosed herein according to certain embodiments. FIG. 9 includes a spectral diagram 900, the frequency range of which is divided into four zones: Zone-0, Zone-1, Zone-2, and Zone-3. If the peak of the power (or magnitude) spectrum of the received SFN determination sequence determined using techniques disclosed herein is in Zone-0, the SFN of the received NSSS subframe may correspond to the first system frame (with an offset of 0 ms) in an 80-ms NSSS repetition interval. If the peak of the power (or magnitude) spectrum of the received SFN determination sequence determined using techniques disclosed herein is in Zone-1, the SFN of the received NSSS subframe may correspond to the third system frame (with an offset of 20 ms) in an 80-ms NSSS repetition interval. If the peak of the power (or magnitude) spectrum of the received SFN determination sequence determined using techniques disclosed herein is in Zone-2, the SFN of the received NSSS subframe may correspond to the fifth system frame (with an offset of 40 ms) in an 80-ms NSSS repetition interval. If the peak of the power (or magnitude) spectrum of the received SFN determination sequence determined using techniques disclosed herein is in Zone-3, the SFN of the received NSSS subframe may correspond to the seventh system frame (with an offset of 60 ms) in an 80-ms NSSS repetition interval.

In one example where the FFT size is 128, the following logic may be implemented to estimate the SFN based on the averaged power (or magnitude) spectrum F (e.g., an averaged periodogram):

```
K=64
if maxInd1>60 || maxInd1<=10
    Frame_Number_Estimate = 0ms;
elseif maxInd1>10 && maxInd1<=25
    Frame_Number_Estimate = 60ms;
elseif maxInd1>25 && maxInd1<=40
    Frame_Number_Estimate = 40ms;
elseif maxInd1>40 && maxInd1<=60
    Frame_Number_Estimate = 20ms;
End
```

In this example, if the index of the peak signal in the power spectrum is less than or equal to 10 or is greater than 60 (in Zone-0), the SFN of the received NSSS subframe may correspond to the first system frame (with an offset of 0 ms) in an 80-ms NSSS repetition interval. If the index of the peak signal in the power spectrum is greater than 10 but no greater than 25 (in Zone-3), the SFN of the received NSSS subframe may correspond to the seventh system frame (with an offset of 60 ms) in an 80-ms NSSS repetition interval. If the index of the peak signal in the power spectrum is greater than 25 but no greater than 40 (in Zone-2), the SFN of the received NSSS subframe may correspond to the fifth system frame (with an offset of 40 ms) in an 80-ms NSSS repetition interval. If the index of the peak signal in the power spectrum is greater than 40 but no greater than 60 (in Zone-1), the SFN of the received NSSS subframe may correspond to the third system frame (with an offset of 20 ms) in an 80-ms NSSS repetition interval.

In the example shown in FIG. 9, a curve 910 shows the power spectrum of an ideal SFN determination sequence transmitted in the third frame of an 80-ms NSSS repetition interval. A curve 920 shows the frequency domain signal of the received SFN determination sequence determined using techniques disclosed herein. Since the frequency domain signal of the received SFN determination sequence is in Zone-1, the received SFN determination sequence may be transmitted in the third system frame (with an offset of 20 ms) of an 80-ms NSSS repetition interval.

Figure 10A:
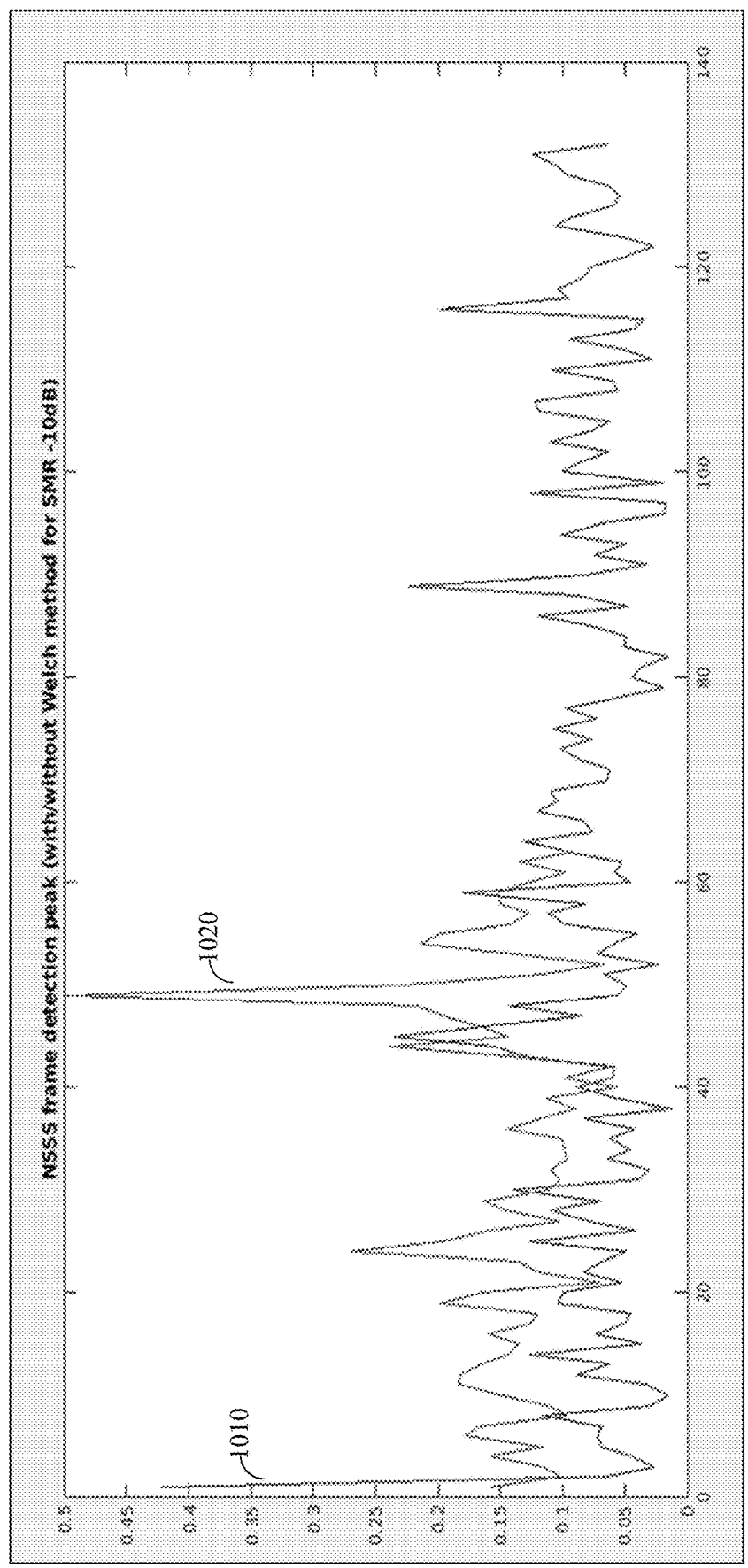
FIG. 10A illustrates an example of improving NSSS signal detection under low signal-to-noise ratio (SNR) conditions using techniques disclosed herein according to certain embodiments.

FIG. 10A illustrates an example of improving NSSS signal detection under low SNR conditions using techniques disclosed herein according to certain embodiments. In FIG. 10A, a curve 1010 shows the power spectrum (e.g., a periodogram) of the received SFN determination sequence calculated without performing overlapped segmentation and windowing of the received SFN determination sequence. In the illustrated example, the SNR of the received NSSS is about −10 dB. Curve 1010 shows no apparent peak signal in the power spectrum. Thus, the NSSS signal may not be detected or may be erroneously identified due to the low SNR. A curve 1020 in FIG. 10A shows the power spectrum (e.g., a periodogram) of the received SFN determination sequence calculated by performing overlapped segmentation and windowing of the received SFN determination sequence as described above. Curve 1020 shows a peak signal in Zone-1 (e.g., between frequency bin 40 and frequency bin 60) that corresponds to the third system frame (with an offset of 20 ms) in an 80-ms NSSS repetition interval. Thus, techniques disclosed herein can correctly detect a peak signal representing the NSSS signal (more specifically, the SFN determination sequence) in the power spectrum, and the 3 LSBs of the SFN of the received NSSS is 2 (corresponding to an offset of 20 ms in the 80-ms NSSS repetition interval).

Figure 10B:
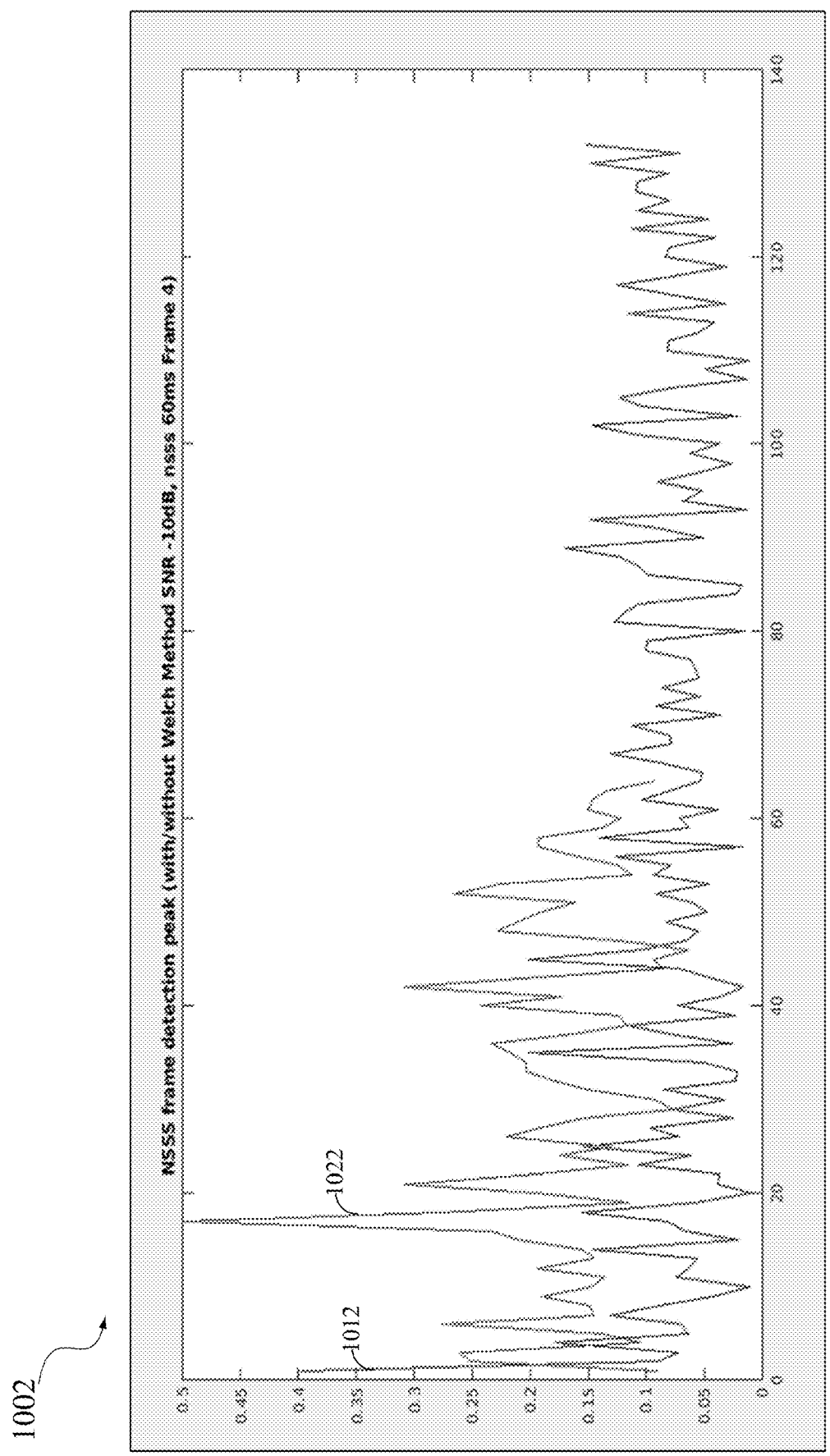
FIG. 10B illustrates another example of improving NSSS signal detection under low SNR conditions using techniques disclosed herein according to certain embodiments.

FIG. 10B illustrates another example of improving NSSS signal detection under low SNR conditions using techniques disclosed herein according to certain embodiments. In FIG. 10B, a curve 1012 shows the power spectrum (e.g., a periodogram) of the received SFN determination sequence calculated without performing overlapped segmentation and windowing of the received SFN determination sequence. In the illustrated example, the SNR of the received NSSS is about −10 dB. Curve 1012 shows no apparent peak signal in the power spectrum. Thus, the NSSS signal may not be detected or may be erroneously identified due to the low SNR. A curve 1022 shows the power spectrum (e.g., a periodogram) of the received SFN determination sequence calculated by performing the overlapped segmentation and windowing of the received SFN determination sequence as described above. Curve 1022 shows a peak signal in Zone-3 (e.g., between frequency bin 10 and frequency bin 25) that corresponds to the seventh system frame (with an offset of 60 ms) in an 80-ms NSSS repetition interval. Thus, techniques disclosed herein can correctly detect a peak signal representing the NSSS signal (more specifically, the SFN determination sequence) in the power spectrum, and the 3 LSBs of the SFN of the received NSSS is 6 (corresponding to an offset of 60 ms in the 80-ms NSSS repetition interval).

Based on the zone k (k=0, 1, 2, or 3) in which the peak signal of the power spectrum is detect, a segment k of the received SFN determination sequence (e.g., the equalized or normalized received NSSS sequence) may be selected and windowed, a high-order DFT (e.g., an nfft-point FFT with nfft>=1024, such as 4096) of the selected and windowed segment k may be performed, and the magnitudes or the squared magnitudes (power levels) of the signals in the frequency bins of the high-order DFT may be determined according to:

$$F_k = \text{abs}(\mathit{fft}(\hat{S}_k \cdot W, \mathit{nfft})). \qquad (19)$$

In one example, the high-order DFT may be a 4096-point FFT, and segment k of the received SFN determination sequence (e.g., the received NSSS sequence equalized or normalized using the estimated ideal PCID vector) may be selected as follows:

segment 0=[<640, >3840],
segment 3=[>640, <=1600],
segment 2=[>1600, <=2560], and
segment 1=[>2560, <3840].

If the peak signal representing the SFN determination sequence is detected in the kth zone of the power spectrum, the center index of the kth zone is m, and the index of the peak signal in $F_k$ is n, the CFO of the UE may be determined according to:

$$\Delta_f = (m-n)\Delta_{step}, \quad (20)$$

where $\Delta_{step} = \text{nfft}/15000$, and 15000 is the subcarrier index spacing.

Figure 11:
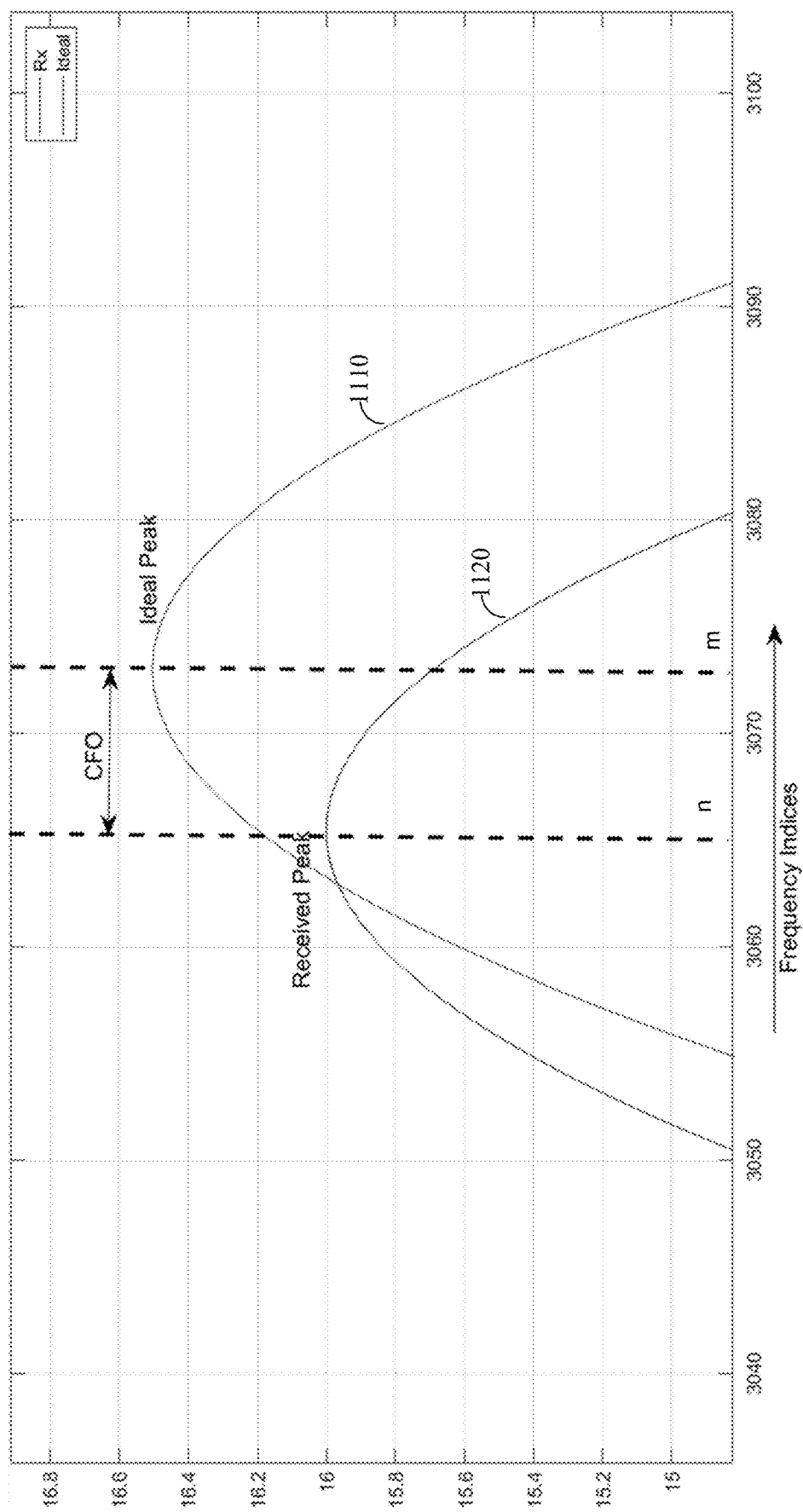
FIG. 11 illustrates an example of a method of estimating Carrier Frequency Offset (CFO) according to certain embodiments.

FIG. 11 illustrates an example of a method of estimating the CFO of a UE according to certain embodiments. FIG. 11 includes a curve 1110 showing the power spectrum of an ideal SFN determination sequence transmitted in the third frame (with an offset of 20 ms) of an 80-ms NSSS repetition interval, where the peak of the power spectrum may be in bin m in frequency zone 1 of the four frequency zones corresponding to four different SFNs. A curve 1120 in FIG. 11 shows the power spectrum of a received SFN determination sequence transmitted in the third frame (with an offset of 20 ms) of an 80-ms NSSS repetition interval, where the peak of the power spectrum may also be in frequency zone 1 of the four frequency zones, but may be in bin n that is offset from bin m. The CFO may then be determined using Equation (20) described above.

Figure 12:
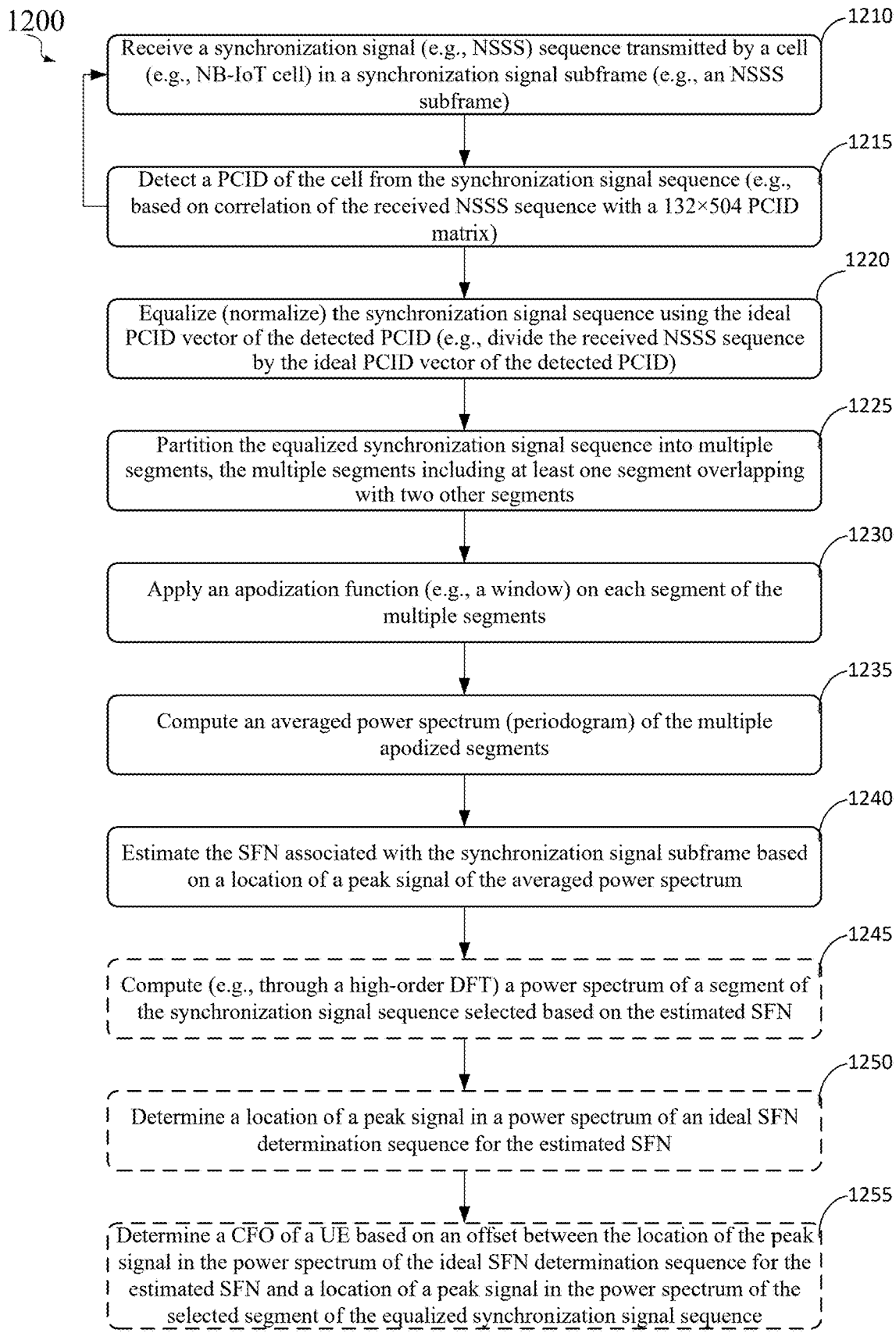
FIG. 12 includes a flowchart illustrating an example of a method of estimating SFN Numbers and CFO according to certain embodiments.

FIG. 12 includes a flowchart 1200 illustrating an example of a method of estimating the SFN of a received radio frame and the CFO of a UE with respect to a cell (e.g., an eNB) according to certain embodiments. The operations described in flowchart 1200 are for illustration purposes only and are not intended to be limiting. In various implementations, modifications may be made to flowchart 1200 to add additional operations, to omit some operations, to combine some operations, to split some operations, or to change the order of the operations. The operations described in flowchart 1200 may be performed by, for example, a UE 140 or a UE 1300 described below with respect to FIG. 13.

At block 1210, the operations may include receiving, for example, via a wireless receiver, a synchronization signal sequence transmitted by a cell in a synchronization signal subframe. The wireless receiver may include an RF receiver that may include an antenna, a tunable filter, a local oscillator, mixers, I/Q receive channels, analog-to-digital converters (ADCs), and buffers. The wireless receiver may also include demodulation circuits that may demodulated, for example, OFDM signals. In some embodiments, the wireless receiver may perform process 210 and operation 220 described above with respect to FIG. 2. In one example, the cell may include a Narrowband Internet of Thing (NB-IoT) cell, and the synchronization signal sequence may include an NSSS sequence as described in, for example, 3GPP TS36.211 and TS36.212 standards. As described above, the NSSS sequence may be transmitted by an eNB in subframe 9 of an even-numbered system frame, and may be received and demodulated into a 132-element sequence by an NB-IoT UE.

At block 1215, the operations may include detecting a PCID of the cell from the synchronization signal sequence. In one example, determining the PCID of the cell based on the synchronization signal sequence may include correlating the synchronization signal sequence with a PCID matrix that includes ideal PCID vectors of a plurality of PCIDs. For example, the PCID of an NB IoT cell that transmits the NSSS may be determined based on the correlation of the received NSSS sequence (e.g., Vector Y) with a 132×504 PCID matrix (e.g., PCID matrix Q) using matrix operation $Z = Q^H Y$ described above, where the index of the element of vector Z having the maximum value may indicate the PCID of the cell. Based on the determined PCID, an ideal PCID vector for the determined PCID may be extracted from the PCID matrix Q. In some embodiments, if the maximum value of vector Z is less than a threshold value, the PCID may not be determined, and a new NSSS sequence in another NSSS subframe may be received and processed to determine the PCID of the cell.

Operations at block 1220 may include equalizing (or normalizing) the synchronization signal sequence using the ideal PCID vector of the detected PCID, for example, by dividing the received synchronization signal sequence using the ideal PCID vector of the determined PCID, as described above with respect to Equations (12)-(14).

Operations at block 1225 may include partitioning the equalized synchronization signal sequence into multiple segments (e.g., three or more segments), the multiple segments including at least one segment overlapping with two other segments. In some embodiments, an overlap between two consecutive segments of the multiple segments is greater than zero and is equal to or less than a half of a size of each segment. In one example, partitioning the equalized synchronization signal sequence into the multiple segments may include partitioning the equalized synchronization signal sequence into three segments, where a size of each segment of the three segments may be equal to a half of a size of the equalized synchronization signal sequence, and the overlap between two consecutive segments of the three segments is equal to a half of the size of each segment of the three segments.

Operations at block 1230 may include applying an apodization function (e.g., a window function) on each segment of the multiple overlapped segments to gradually bring elements of each segment to zero at both ends of the segment. The apodization function may include, for example, a Hanning window, a Hamming window, a cosine window, a Blackman window, a Gaussian window, a Bartlett window, a Welch window, a Nuttall window, or a Blackman-Harris window.

Operations at block 1235 may include computing an averaged power (or magnitude) spectrum (e.g., a periodogram) of the multiple overlapped, windowed segments. The averaged power spectrum may be computed by performing a discrete Fourier transform (DFT) on each windowed segment, determining a power spectrum (e.g., taking the magnitude or the magnitude-squared) of each windowed segment based on the DFT, and averaging the power spectra of the multiple, windowed segments to generated an averaged power spectrum (e.g., periodogram) of the equalized synchronization signal sequence.

Operations at block 1240 may include estimating the SFN associated with the synchronization signal subframe based on a location of a peak signal of the averaged power spectrum. For example, the averaged power spectrum of the equalized synchronization signal sequence may be divided into multiple frequency zones (e.g., four frequency zones for NB IoT NSSS), each frequency zone of the multiple frequency zones corresponding to a respective SFN. The SFN associated with the synchronization signal subframe may be determined based on a frequency zone in which the peak signal of the averaged power spectrum is located, as described above with respect to, for example, FIGS. 6 and 9.

Optionally, operations at block 1245 may include computing a high-resolution power spectrum of a segment of the synchronization signal sequence selected based on the SFN estimated at block 1240. As described above, the selected segment of the equalized synchronization signal sequence may be windowed, a high-order DFT (e.g., an n-point FFT with n>=1024) may be performed on the selected, windowed segment of the equalized synchronization signal sequence, and a power spectrum of the selected segment of the equalized synchronization signal sequence may be calculated based on the high-order DFT, as described above, for example, with respect to Equation (19).

Optionally, operations at block 1250 may include determining a location of a peak signal in a power spectrum of an ideal SFN determination sequence for the estimated SFN. For example, the location of the peak signal in the power spectrum of the ideal SFN determination sequence may be determined based on a center index of the frequency zone corresponding to the estimated SFN, or may be determined by performing an n-point FFT on an ideal SFN determination sequence.

Optionally, operations at block 1255 may include determining a CFO of a UE with respect to the cell based on an offset between the location of the peak signal in the power spectrum of the ideal SFN determination sequence for the estimated SFN and a location of a peak signal in the power spectrum of the selected segment of the equalized synchronization signal sequence, as described above with respect to, for example, FIG. 11 and Equation (20).

As described above, the PCID and SFN detection and CFO Estimation using NSSS may become complicated when noise is added by, for example, interference from neighboring cells. In 3GPP LTE, NB-IOT and eMTC, the interference by neighboring cells may become prominent during intra-frequency transmissions (signals of same frequency transmitted by multiple neighboring base stations). There may be two types of multi-cell intra-frequency interference in LTE/eMTC/NB-IOT/5G/6G standards. In the first multi-cell intra-frequency interference scenario, the serving cell and neighboring cells may have the same frequency, that is, multiple neighboring eNBs may use the same carrier frequency Fc but with different PCIDs. But the physical channels may not overlap, and the subframe numbers may not overlap. In the second multi-cell intra-frequency interference scenario, the serving cell and neighboring cells may have the same frequency (sharing the same carrier frequency Fc but with different PCIDs) and same subframe numbers, and the NSSS of multiple eNBs may overlap. Thus, detecting PCIDs and SFNs of the serving cells and overlapped cells may be difficult in this scenario. Techniques disclosed herein can solve the problem and effectively estimate the SFN number and CFO in such scenarios.

In one illustrative example, D1 and D2 are dominant cells, S is the serving cell, and $P_{D1} > P_{D2} > P_s$, where $P_{D1}$ is the power of the highly dominant cell, $P_{D2}$ is the power of next dominant cell, and $P_s$ is the power of serving cell. The total received signal may be given by:

$$Y = h_{D1} * x_{D1} + h_{D2} * x_{D2} + h_s * x_s + \text{noise}. \quad (21)$$

Figure 13:
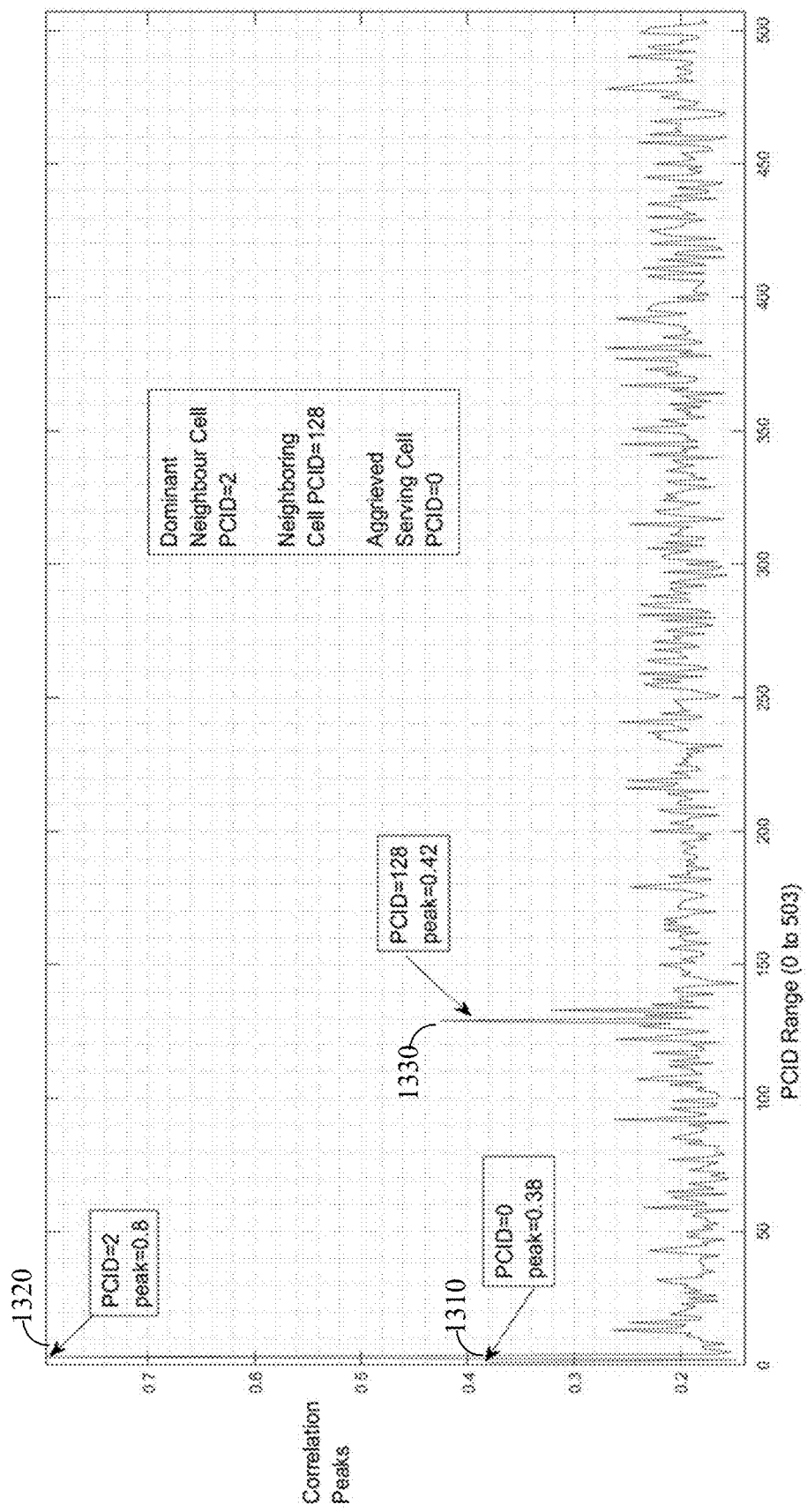
FIG. 13 includes an example of a UE, which may be utilized to implement techniques described herein according to certain embodiments.
Figure 14:
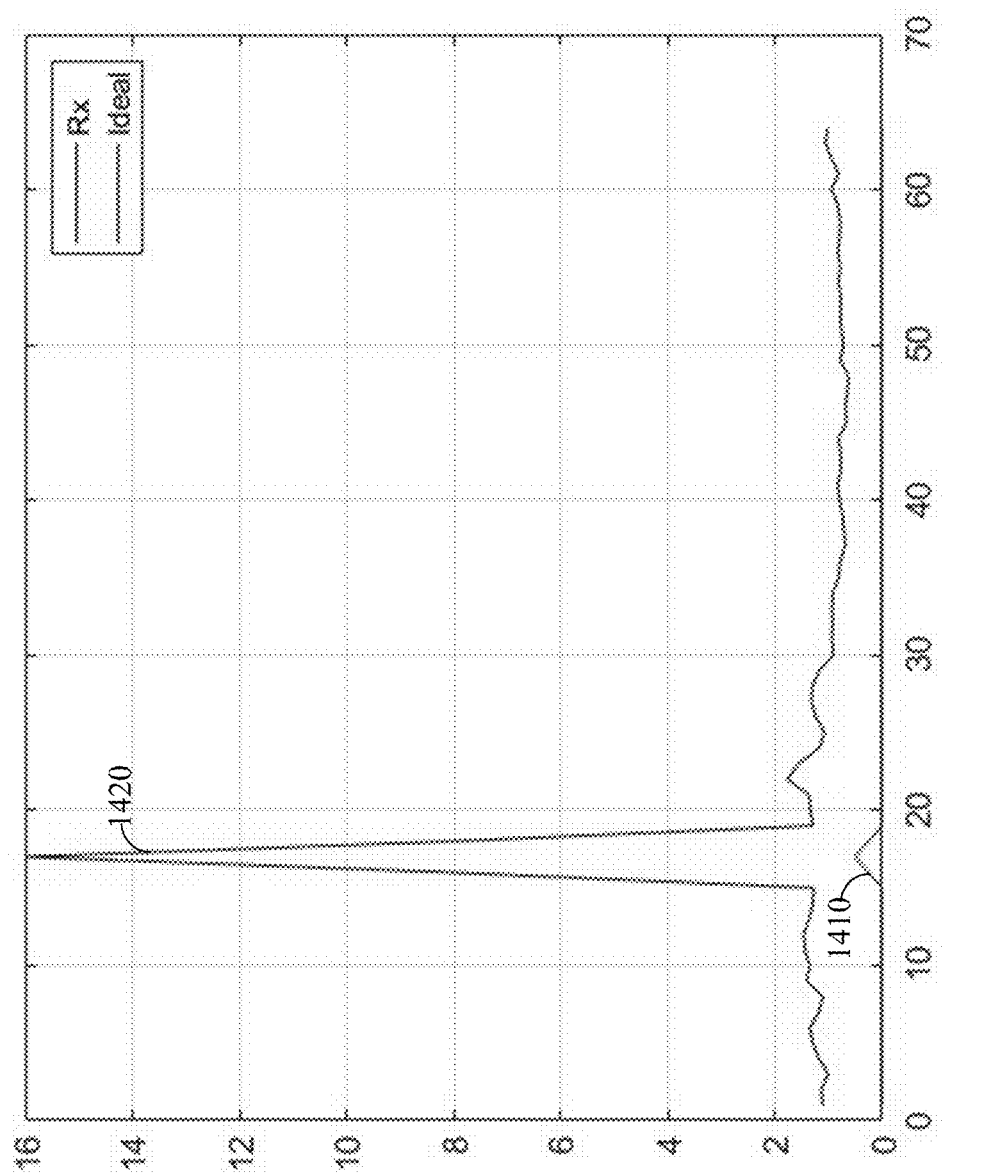
FIG. 14 includes a diagram illustrating an example of correlation detection of system frame number according to certain embodiments.

Techniques disclosed herein were used to determine the PCID and SFN in this example, and the results are shown in FIGS. 13 and 14 described below.

FIG. 13 includes a diagram illustrating examples of correlation peaks and the corresponding PCIDs estimated using the S1 component of the NSSS sequence described above. In the illustrated example, the interfering neighboring cells include a cell with PCID=2 (the dominant cell), a cell with PCID=128 (the next dominant cell), and a cell with PCID=0 (the serving cell). Thus, the cell with PCID=2 is represented by $x_{D1}$ in equation (21), the cell with PCID=128 is represented by $x_{D2}$ in equation (21), and the cell with PCID=0 is represented by $x_s$ in equation (21). The S1 component of the NSSS sequence is used to estimate the PCIDs by correlating the received vector Y (sequence or vector length 132) with all 504 possible PCID column vectors of matrix $Q_{132 \times 504}$ as described above. The correlation results shown in FIG. 13 have three peaks corresponding to the three cells. A first correlation peak 1310 at PCID=0 corresponds to the serving cell, a second correlation peak 1320 at PCID=2 may correspond to the dominant cell, and a third correlation peak 1330 at PCID=128 may correspond to the next dominant cell. In order to determine the SFN and CFO of the serving cell, the ideal PCID vector of the first correlation peak 1310 at PCID=0 and corresponding to the serving cell may be used to estimate $S_2$ as described above with respect to, for example, equations (12)-(14), and then the SFN information may be determined from $S_2$ using the power spectrum (e.g., the periodogram) of the received SFN determination sequence calculated by performing the overlapped segmentation and windowing of the received SFN determination sequence as described herein.

FIG. 14 includes a diagram illustrating an example of correlation detection of SFN using the periodogram of windowed segments of the estimated SFN determination sequence for the example shown in FIG. 13, according to certain embodiments. As described above with respect to, for example, FIG. 9, the SFN may be determined based on the four frequency zones of the power spectrum corresponding to four different respective SFNs, and the location of the peak of the power spectrum peak. In the example shown in FIG. 14, a curve 1410 shows the power spectrum of an ideal SFN determination sequence transmitted in a frame of an 80-ms NSSS repetition interval. A curve 1420 shows the frequency domain signal of the received SFN determination sequence determined using techniques disclosed herein. FIG. 14 shows that the SFN number can be correctly and consistently estimated using techniques disclosed herein, even in the presence of multiple dominant interfering neighboring cells.

Figure 15:
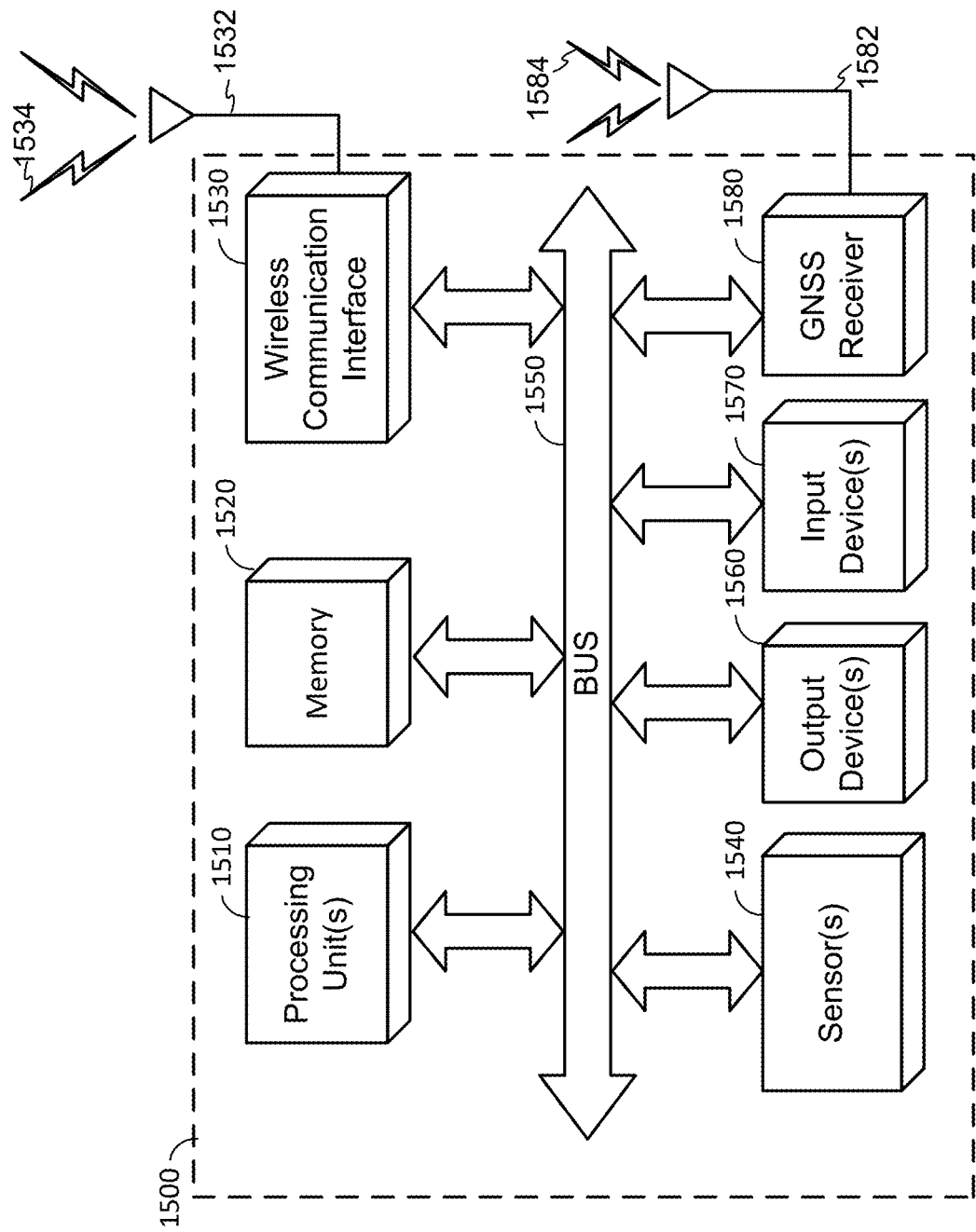
FIG. 15 illustrates a block diagram of an example of a user equipment according to certain embodiments.

FIG. 15 illustrates an example of a UE 1500 according to certain embodiments, which may be utilized to implement techniques described herein above. UE 1500 may be an example of UE 140. It should be noted that FIG. 15 is meant only to provide a generalized illustration of various components, any or all of which may be utilized as appropriate. It can be noted that, in some instances, components illustrated by FIG. 15 can be localized to a single physical device and/or distributed among various networked devices, which may be disposed at different physical locations. Furthermore, as previously noted, the functionality of the UE discussed in the previously described embodiments may be executed by one or more of the hardware and/or software components illustrated in FIG. 15.

UE 1500 is shown comprising hardware elements that can be electrically coupled via a bus 1550 (or may otherwise be in communication, as appropriate). The hardware elements may include one or more processing units 1510 which can include without limitation one or more general-purpose processors, one or more special-purpose processors (such as digital signal processor (DSP) chips, graphics acceleration processors, application specific integrated circuits (ASICs), and/or the like), and/or other processing structures or means. In some embodiments, UE 1500 may have a separate DSP, depending on desired functionality. Location determination and/or other determinations based on wireless communication may be provided in processing unit(s) 1510 and/or wireless communication interface 1530 (discussed below). UE 1500 also can include one or more input devices 1570, which can include without limitation one or more keyboards, touch screens, touch pads, microphones, buttons, dials, switches, and/or the like; and one or more output devices 1560, which can include without limitation one or more displays (e.g., touch screens), light emitting diodes (LEDs), speakers, and/or the like.

UE 1500 may also include a wireless communication interface 1530, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable UE 1500 to communicate with other devices as described in the embodiments above. As such, wireless communication interface 1530 can include RF circuitry (e.g., an RF transceiver) capable of being tuned to transmit and/or receive RF signals (e.g., 3GPP RF signals) as described herein. Wireless communication interface 1530 may permit data and signaling to be communicated (e.g., transmitted and received) with Tx/Rx points (TRPs) of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 1532 that send and/or receive wireless signals 1534. According to some embodiments, wireless communication antenna(s) 1532 may comprise a plurality of discrete antennas, antenna arrays, or any combination thereof.

Depending on desired functionality, wireless communication interface 1530 may comprise a separate receiver and transmitter, or any combination of transceivers, transmitters, and/or receivers to communicate with base stations (e.g., ng-eNBs and gNBs) and other terrestrial transceivers, such as wireless devices and access points. UE 1500 may communicate with different data networks that may comprise various network types. For example, a Wireless Wide Area Network (WWAN) may be a CDMA network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMAX (IEEE 802.16) network, and so on. A CDMA network may implement one or more RATs such as CDMA2000, WCDMA, and so on. CDMA2000 includes IS-95, IS-2000 and/or IS-856 standards. A TDMA network may implement GSM, Digital Advanced Mobile Phone System (D-AMPS), or some other RAT. An OFDMA network may employ LTE, LTE Advanced, 5G NR, and so on. 5G NR, LTE, LTE Advanced, GSM, and WCDMA are described in documents from 3GPP. Cdma2000 is described in documents from a consortium named "3rd Generation Partnership Project 3" (3GPP2). 3GPP and 3GPP2 documents are publicly available. A WLAN may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

UE 1500 can further include sensor(s) 1540. Sensors 1540 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of UE 1500 may also include a Global Navigation Satellite System (GNSS) receiver 1580 capable of receiving signals 1584 from one or more GNSS satellites using an antenna 1582 (which could be the same as wireless communication antenna 1532). Positioning based on GNSS signal measurement can be utilized to complement and/or incorporate the techniques described herein. GNSS receiver 1580 can extract a position of UE 1500, using conventional techniques, from GNSS satellites of a GNSS system, such as Global Positioning System (GPS), Galileo, GLONASS, Quasi-Zenith Satellite System (QZSS) over Japan, Indian Regional Navigational Satellite System (IRNSS) over India, BeiDou Navigation Satellite System (BDS) over China, and/or the like. Moreover, the GNSS receiver 1580 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 1580 is illustrated in FIG. 15 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processing units, such as processing unit(s) 1510, a DSP, and/or a processing unit within wireless communication interface 1530 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processing units, such as processing unit(s) 1510 or a DSP.

UE 1500 may further include and/or be in communication with a memory 1520. Memory 1520 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

Memory 1520 of the UE 1500 also can comprise software elements (not shown in FIG. 15), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1520 that are executable by UE 1500 (and/or processing unit(s) 1510 or the DSP within UE 1500). In an aspect, then such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" or "computer-readable medium" as used herein refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout the present disclosure discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of the present disclosure, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean A, B, C, or any combination of A, B, and/or C, such as AB, AA, AC, AAB, AABBCCC, and the like.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

What is claimed is:

1. A method comprising:
   receiving a synchronization signal sequence transmitted by a cell in a synchronization signal subframe;
   determining a physical cell identity (PCID) of the cell based on the synchronization signal sequence;
   equalizing the synchronization signal sequence using an ideal PCID vector of the determined PCID;
   partitioning the equalized synchronization signal sequence into multiple segments, the multiple segments including at least one segment overlapping with two other segments of the multiple segments;
   windowing each segment of the multiple segments; computing power spectra of the multiple windowed segments;
   determining an averaged power spectrum of the equalized synchronization signal sequence based on the power spectra of the multiple windowed segments; and
   estimating a system frame number (SFN) associated with the synchronization signal subframe based on a location of a peak signal of the averaged power spectrum of the equalized synchronization signal sequence.

2. The method of claim 1, wherein the cell includes a Narrowband Internet of Thing (NB-IoT) cell.

3. The method of claim 1, wherein the synchronization signal sequence includes a Narrowband Secondary Synchronization Signal (NSSS) sequence.

4. The method of claim 3, wherein estimating the SFN associated with the synchronization signal subframe comprises:
   dividing the averaged power spectrum of the equalized synchronization signal sequence into four frequency zones, each frequency zone of the four frequency zones corresponding to a respective SFN; and
   estimating the SFN associated with the synchronization signal subframe based on a frequency zone in which the peak signal of the averaged power spectrum is located.

5. The method of claim 1, wherein determining the PCID of the cell based on the synchronization signal sequence comprises correlating the synchronization signal sequence with a PCID matrix that includes ideal PCID vectors of a plurality of PCIDs.

6. The method of claim 1, wherein equalizing the synchronization signal sequence using the ideal PCID vector of the determined PCID comprises dividing the synchronization signal sequence by the ideal PCID vector of the determined PCID.

7. The method of claim 1, wherein an overlap between two consecutive segments of the multiple segments is greater than zero and is equal to or less than a half of a size of the at least one segment.

8. The method of claim 7, wherein:
partitioning the equalized synchronization signal sequence into the multiple segments comprises partitioning the equalized synchronization signal sequence into three segments;
a size of each segment of the three segments is equal to a half of a size of the equalized synchronization signal sequence; and
the overlap between two consecutive segments of the three segments is equal to a half of the size of each segment of the three segments.

9. The method of claim 1, wherein windowing each segment of the multiple segments comprises applying an apodization function to the segment to gradually bring elements of the segment to zero at both ends of the segment.

10. The method of claim 9, wherein the apodization function includes a Hanning window, a Hamming window, a cosine window, a Blackman window, a Gaussian window, a Bartlett window, a Welch window, a Nuttall window, or a Blackman-Harris window.

11. The method of claim 1, wherein computing the power spectra of the multiple windowed segments comprises, for each windowed segment of the multiple windowed segments:
performing a discrete Fourier transform (DFT) on the windowed segment; and
determining a periodogram of the windowed segment based on the DFT.

12. The method of claim 1, further comprising:
selecting a segment of the equalized synchronization signal sequence based on the estimated SFN;
computing a high-order DFT of the selected segment of the equalized synchronization signal sequence;
determining a power spectrum of the selected segment of the equalized synchronization signal sequence based on the high-order DFT;
determining a location of a peak signal in a power spectrum of an ideal SFN determination sequence for the estimated SFN; and
determining a Carrier Frequency Offset (CFO) of a user equipment (UE) based on an offset between the location of the peak signal in the power spectrum of the ideal SFN determination sequence for the estimated SFN and a location of a peak signal in the power spectrum of the selected segment of the equalized synchronization signal sequence.

13. A device comprising:
a wireless receiver;
a memory; and
one or more processing units communicatively coupled to the wireless receiver and the memory, and configured to perform operations comprising:
receiving, via the wireless receiver, a synchronization signal sequence transmitted by a cell in a synchronization signal subframe;
determining a physical cell identity (PCID) of the cell based on the synchronization signal sequence;
equalizing the synchronization signal sequence using an ideal PCID vector of the determined PCID;
partitioning the equalized synchronization signal sequence into multiple segments, the multiple segments including at least one segment overlapping with two other segments of the multiple segments;
windowing each segment of the multiple segments; computing periodograms of the multiple windowed segments;
determining an averaged periodogram of the equalized synchronization signal sequence based on the periodograms of the multiple windowed segments; and
estimating a system frame number (SFN) associated with the synchronization 20 signal subframe based on a location of a peak signal in the averaged periodogram of the equalized synchronization signal sequence.

14. The device of claim 13, wherein:
the cell includes a Narrowband Internet of Thing (NB-IoT) cell;
the device includes an NB-IoT user equipment (UE);
the synchronization signal sequence includes a Narrowband Secondary Synchronization Signal (NSSS) sequence; and
estimating the SFN associated with the synchronization signal subframe comprises:
dividing the averaged periodogram of the equalized synchronization signal sequence into four frequency zones, each frequency zone of the four frequency zones corresponding to a respective SFN; and
estimating the SFN associated with the synchronization signal subframe based on a frequency zone in which the peak signal of the averaged periodogram is located.

15. The device of claim 13, wherein:
determining the PCID of the cell based on the synchronization signal sequence comprises correlating the synchronization signal sequence with a PCID matrix that includes ideal PCID vectors of a plurality of PCIDs; and
equalizing the synchronization signal sequence using the ideal PCID vector of the determined PCID comprises dividing the synchronization signal sequence by the ideal PCID vector of the determined PCID.

16. The device of claim 13, wherein an overlap between two consecutive segments of the multiple segments is greater than zero and is equal to or less than a half of a size of the at least one segment.

17. The device of claim 13, wherein windowing each segment of the multiple segments comprises applying an apodization function to the segment to gradually bring elements 3 of the segment to zero at both ends of the segment.

18. The device of claim 13, wherein the operations further comprise:
selecting a segment of the equalized synchronization signal sequence based on the estimated SFN;
computing a high-order DFT of the selected segment of the equalized synchronization signal sequence;
determining a periodogram of the selected segment of the equalized synchronization signal sequence based on the high-order DFT;
determining a location of a peak signal in a periodogram of an ideal SFN determination sequence for the estimated SFN; and
determining a Carrier Frequency Offset (CFO) of the device based on an offset between the location of the peak signal in the periodogram of the ideal SFN determination sequence for the estimated SFN and a location of a peak signal in the periodogram of the selected segment of the equalized synchronization signal sequence.

19. A non-transitory computer-readable medium having instructions embedded thereon, the instructions, when executed by one or more processing units, causing the one or more processing units to perform operations comprising:
receiving a synchronization signal sequence transmitted by a cell in a synchronization signal subframe;
determining a physical cell identity (PCID) of the cell based on the synchronization signal sequence;
equalizing the synchronization signal sequence using an ideal PCID vector of the determined PCID;
partitioning the equalized synchronization signal sequence into multiple segments, the multiple segments including at least one segment overlapping with two other segments of the multiple segments;
windowing each segment of the multiple segments;
computing power spectra of the multiple windowed segments;
determining an averaged power spectrum of the equalized synchronization signal 16 sequence based on the power spectra of the multiple windowed segments; and
estimating a system frame number (SFN) associated with the synchronization signal subframe based on a location of a peak signal in the averaged power spectrum of the equalized synchronization signal sequence.

20. The non-transitory computer-readable medium of claim 19, wherein the operations further comprise:
selecting a segment of the equalized synchronization signal sequence based on the estimated SFN;
computing a high-order DFT of the selected segment of the equalized synchronization signal sequence;
determining a power spectrum of the selected segment of the equalized synchronization signal sequence based on the high-order DFT;
determining a location of a peak signal in a power spectrum of an ideal SFN determination sequence for the estimated SFN; and
determining a Carrier Frequency Offset (CFO) of a user equipment (UE) based on an offset between the location of the peak signal in the power spectrum of the ideal SFN determination sequence for the estimated SFN and a location of a peak signal in the power spectrum of the selected segment of the equalized synchronization signal sequence.

* * * * *

UNITED STATES PATENT AND TRADEMARK OFFICE
CERTIFICATE OF CORRECTION

| | |
|---|---|
| PATENT NO. | : 12,317,205 B2 |
| APPLICATION NO. | : 17/820389 |
| DATED | : May 27, 2025 |
| INVENTOR(S) | : Sondur Lakshmipathi |

Page 1 of 1

It is certified that error appears in the above-identified patent and that said Letters Patent is hereby corrected as shown below:

In the Claims i. Column 30, Line 8: change "the synchronization 20 signal subframe based on a" to -- the synchronization signal subframe based on a -- ii. Column 30, Line 45: change "elements 3 of the segment to zero at both ends of the" to -- elements of the segment to zero at both ends of the -- iii. Column 31, Line 17: change "synchronization signal 16 sequence based on the power" to -- synchronization signal sequence based on the power --

Signed and Sealed this
Eighth Day of July, 2025

Coke Morgan Stewart
*Acting Director of the United States Patent and Trademark Office*